(12) United States Patent
Itani et al.

(10) Patent No.: US 6,958,784 B2
(45) Date of Patent: Oct. 25, 2005

(54) VIDEO SIGNAL PROCESSING APPARATUS USING MULTI-CONVERSION STAGES

(75) Inventors: Tetsuya Itani, Ikoma (JP); Keiichi Kuroda, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 827 days.

(21) Appl. No.: 09/948,988

(22) Filed: Sep. 7, 2001

(65) Prior Publication Data

US 2002/0094121 A1 Jul. 18, 2002

(30) Foreign Application Priority Data

Sep. 8, 2000 (JP) ........................................ 2000-272811

(51) Int. Cl.⁷ ................................................ H04N 5/21
(52) U.S. Cl. ........................ 348/630; 348/649; 386/31
(58) Field of Search ................................ 348/630, 649, 348/655, 656, 71, 708, 675, 679, 223.1, 253, 256; 382/167; 386/9, 17, 31, 44, 45

(56) References Cited

U.S. PATENT DOCUMENTS

| | | | |
|---|---|---|---|
| 4,866,511 A | * | 9/1989 | Belmares-Sarabia et al. .... 348/ 650 |
| 4,953,011 A | * | 8/1990 | Mori et al. .................... 348/30 |
| 5,122,863 A | * | 6/1992 | Zortea ......................... 348/186 |
| 5,619,280 A | * | 4/1997 | Yamashita et al. .......... 348/645 |
| 5,737,032 A | * | 4/1998 | Stenzel et al. .............. 348/649 |
| 6,111,607 A | * | 8/2000 | Kameyama ................. 348/256 |

FOREIGN PATENT DOCUMENTS

| GB | 2346497 A | 8/2000 |
|---|---|---|
| WO | WO 00/38161 | 6/2000 |

OTHER PUBLICATIONS

Copy of Communication from EPO dated Feb. 24, 2003, containing European Search Report.

\* cited by examiner

*Primary Examiner*—Victor R. Kostak
(74) *Attorney, Agent, or Firm*—Snell & Wilmer L.L.P.

(57) ABSTRACT

A video signal processing apparatus for processing a video signal containing first and second color difference signals so as to adjust colors of an image represented by the video signal is disclosed. The apparatus includes a plurality of gain setting sections for setting respective ones of gain conversion characteristics. The gain conversion characteristics are relevant to saturations indicated by color difference signals. First and second conversion sections are included for converting gains of the color difference signals based on input values of respective color difference signals and the pain conversion characteristics.

10 Claims, 18 Drawing Sheets

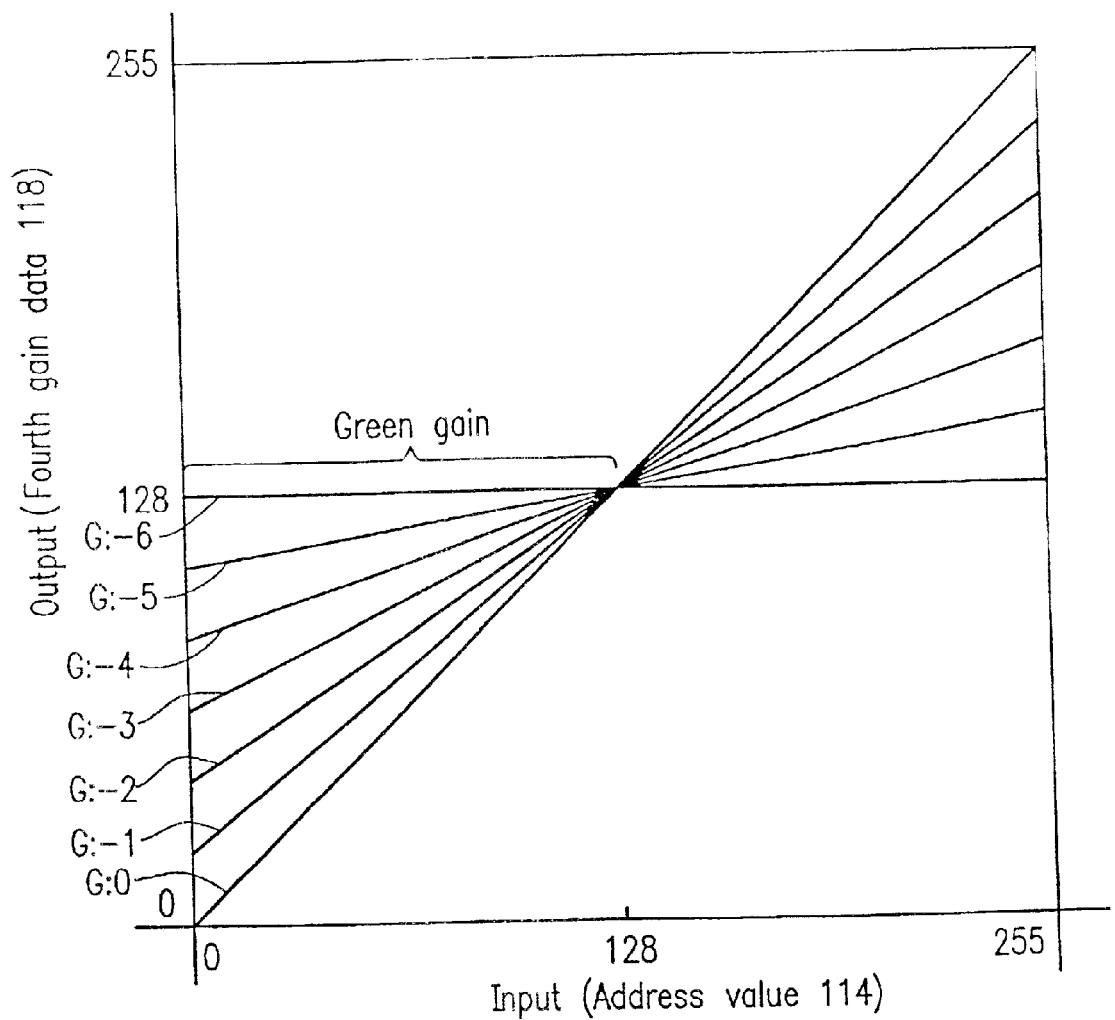

VIDEO SIGNAL PROCESSING APPARATUS USING MULTI-CONVERSION STAGES

BACKGROUND OF THE INVENTION

1. Field of the Invention

The present invention relates to a video signal processing apparatus. More particularly, the present invention relates to a video signal processing apparatus for processing a video signal reproduced from tape media, disk media or the like, or received through satellite broadcast, ground-based broadcast or the like, and particularly for adjusting colors of an image represented by first and second color difference signals contained in the video signal.

2. Description of the Related Art

Conventionally, a video signal reproduced from tape media, disk media or the like, or received through satellite broadcast, ground-based broadcast or the like is typically transmitted in a form of a composite video signal which can be reproduced by television receivers. Recently, as video apparatuses with MPEG compression technology are becoming widespread, video signal processing apparatuses for processing a video signal containing an interlace color difference signal or a progressive color difference signal are being developed.

FIG. 15 is a block diagram showing a configuration of a conventional video signal processing apparatus 1500 relevant to the present invention. The video signal processing apparatus 1500 reproduces a video signal containing a color difference signal which is recorded in a disk-like medium. Referring to FIG. 15, the video signal processing apparatus 1500 includes a pickup 2, a color difference video signal reproducing circuit 4, an encoder 5, a video signal output terminal 6, and a disk rotating device 3. The pickup 2 reads out a video signal containing a color difference signal from a disk 1 on which the video signal is previously recorded in the form of an encoded and modulated signal suitable for recording (or reproduction). The color difference video signal reproducing circuit 4 demodulates and decodes the video signal read out by the pickup 2, and outputs the resultant signal. The encoder 5 converts the video signal containing the color difference signal from the color difference video signal reproducing circuit 4 into a video signal suitable for a monitor (not shown), and outputs the resultant video signal. The video signal output from the encoder 5 is transmitted through the video signal output terminal 6 to the monitor. The disk 1 is rotated at a rpm (revolutions-per-minute) suitable for reproduction by the disk rotating device 3.

The operation of the thus-constructed conventional video signal processing apparatus 1500 will be described below.

FIG. 16 is a schematic diagram showing a color difference vector handled by the video signal processing apparatus 1500. On the disk 1, a progressive video signal or an interlace video signal, which is compressed to an MPEG format, is optically recorded. The video signal recorded on the disk 1 contains a brightness signal, a first color difference signal (CR), and a second color difference signal (CB). As shown in FIG. 16, the first color difference signal (CR) and the second color difference signal (CB) form a color vector.

When the disk 1 is rotated by the disk rotating device 3 at a rpm suitable for reproduction, the pickup 2 reads an optical signal (video signal) recorded on the disk 1 and converts the optical signal to an electrical signal which is then output to the color difference video signal reproducing circuit 4. The color difference video signal reproducing circuit 4 converts the received electrical signal to a digital video signal containing a digital brightness signal, a digital first color difference signal (CR), and a digital second color difference signal (CB).

The encoder 5 converts the above reproduced digital video signal to a video signal suitable for display on a monitor (not shown). Specifically, the encoder 5 adds a synchronization signal to the digital brightness signal and outputs the resultant signal as an analog brightness signal. The digital first color difference signal (CR) and the digital second color difference signal (CB) are also converted to analog signals which are output from the encoder 5. In the case where the video signal recorded on the disk 1 is of a progressive type (480P), a progressive color difference signal is also output. Moreover, the digital first color difference signal (CR) and the digital second color difference signal (CB) are modulated using a color sub-carrier to generate a color signal. The color signal, the brightness signal, and a synchronization signal are combined to generate a composite video signal. The thus-generated analog brightness signal, color difference signal, color signal, and composite video signal are output from the video signal output terminal 6.

The conventional video signal processing apparatus 1500 does not have a function to adjust hue. Therefore, the video signal processing apparatus 1500 cannot perform delicate color adjustment, such as reducing (weakening) a blue color system or tinging white with red, which is a disadvantage.

When the conventional video signal processing apparatus 1500 is used in combination with a monitor, a user can adjust the depth and hue of a color to a level which is desired by the user using an adjustment function attached to the monitor. In monitors, the function to adjust hue modifies the angle of a color vector as indicated by an arrow 1601 in FIG. 16, so that the hues of all colors are changed. Therefore, even when the hue adjustment function of a monitor is used, the hues of all colors are changed. Thus, monitors also cannot perform delicate color adjustment such as reducing (weakening) a blue color system or tinging white with red.

In most monitors, particularly monitors capable of handling progressive video, the video signal transmission system is simplified in order to obtain high-quality images, so that the hue adjustment function is omitted. In a combination with such a monitor, hue cannot be adjusted at all.

Thus, the video signal processing apparatus 1500 cannot perform delicate color adjustment such as reducing (weakening) a blue color system or tinging white with red, which is disadvantage. There is a demand for a video signal processing apparatus which can inexpensively and simply perform more delicate color adjustment.

SUMMARY OF THE INVENTION

According to one aspect of the present invention, a video signal processing apparatus for processing a video signal containing first and second color difference signals so as to adjust colors of an image represented by the video signal, comprises a first gain setting section for setting a first gain conversion characteristic relevant to a first saturation indicated by the first color difference signal, a second gain setting section for setting a second gain conversion characteristic relevant to a second saturation indicated by the second color difference signal, a third gain setting section for setting a third gain conversion characteristic relevant to a third saturation indicated by the first and second color difference signals, a first conversion section for converting a gain of the first color difference signal based on a first input value of the first color difference signal, the first gain conversion characteristic, and the third gain conversion characteristic, and a second conversion section for converting a gain of the second color difference signal based on a second input value of the second color difference signal, the second gain conversion characteristic, and the third gain conversion characteristic.

In one aspect of this invention, the first conversion section converts the gain of the first color difference signal based on the first gain conversion characteristic when the first input value of the first color difference signal falls within a first range, and converts the gain of the first color difference signal based on the third gain conversion characteristic when the first input value of the first color difference signal does not fall within the first range. The second conversion section converts the gain of the second color difference signal based on the second gain conversion characteristic when the second input value of the second color difference signal falls within a second range, and converts the gain of the second color difference signal based on the third gain conversion characteristic when the second input value of the second color difference signal does not fall within the second range.

In one aspect of this invention, the first conversion section converts the gain of the first color difference signal based on the first gain conversion characteristic when the first input value of the first color difference signal is more than or equal to a first threshold, and converts the gain of the first color difference signal based on the third gain conversion characteristic when the first input value of the first color difference signal is less than the first threshold. The second conversion section converts the gain of the second color difference signal based on the second gain conversion characteristic when the second input value of the second color difference signal is more than or equal to a second threshold, and converts the gain of the second color difference signal based on the third gain conversion characteristic when the second input value of the second color difference signal is less than the second threshold.

In one aspect of this invention, the first threshold includes a median representing an achromatic color between red and cyan, and the second threshold includes a median representing an achromatic color between blue and yellow.

In one aspect of this invention, the first saturation includes a saturation of red representing a color depth in the vicinity of red. The second saturation includes a saturation of blue representing a color depth in the vicinity of blue. The third saturation includes a saturation of green representing a color depth in the vicinity of green.

In one aspect of this invention, the first conversion section includes a first gain data generating section for generating first gain data based on the first input value of the first color difference signal and the first gain conversion characteristic, a second gain data generating section for generating second gain data based on the first input value of the first color difference signal and the third gain conversion characteristic, a first selection section for selecting either the first gain data or the second gain data based on the first input value of the first color difference signal, and a first gain converting section for converting the gain of the first color difference signal based on either the first gain data or the second gain data selected by the first selection section. The second conversion section includes a third gain data generating section for generating third gain data based on the second input value of the second color difference signal and the second gain conversion characteristic, a fourth gain data generating section for generating fourth gain data based on the second input value of the second color difference signal and the third gain conversion characteristic, a second selection section for selecting either the third gain data or the fourth gain data based on the second input value of the second color difference signal, and a second gain converting section for converting the gain of the second color difference signal based on either the third gain data or the fourth gain data selected by the second selection section.

According to one aspect of the present invention, a video signal processing apparatus for processing a video signal containing first and second color difference signals so as to adjust colors of an image represented by the video signal, comprises a first offset setting section for setting a first offset conversion characteristic relevant to a first saturation indicated by the first color difference signal, a second offset setting section for setting a second offset conversion characteristic relevant to a second saturation indicated by the second color difference signal, a third offset setting section for setting a third offset conversion characteristic relevant to a third saturation indicated by the first and second color difference signals, a first conversion section for converting an offset of the first color difference signal based on a first input value of the first color difference signal and either the first offset conversion characteristic or the third offset conversion characteristic, and a second conversion section for converting an offset of the second color difference signal based on a second input value of the second color difference signal and either the second offset conversion characteristic or the third offset conversion characteristic.

In one aspect of this invention, the first input value of the first color difference signal has a maximum value relevant to a maximum color saturation of a red color, a minimum value relevant to a maximum color saturation of a cyan color, and a median representing an achromatic color between the red color and the cyan color. The second input value of the second color difference signal has a maximum value relevant to a maximum color saturation of a blue color, a minimum value relevant to a maximum color saturation of a yellow color, and a median representing an achromatic color between the blue color and the yellow color.

In one aspect of this invention, the first saturation includes a saturation of red representing a color depth in the vicinity of red. The first offset conversion characteristic provides an offset value relevant to red. The second saturation includes a saturation of blue representing a color depth in the vicinity of blue. The second offset conversion characteristic provides an offset value relevant to blue. The third saturation includes a saturation of green representing a color depth in the vicinity of green. The third offset conversion characteristic provides an offset value relevant to green.

In one aspect of this invention, the first conversion section includes a first offset data generating section for generating first offset data based on the first input value of the first color difference signal and either the first offset conversion characteristic or the third offset conversion characteristic, and a first offset converting section for converting the offset of the first color difference signal based on the first offset data. The second conversion section includes a second offset data generating section for generating second offset data based on the second input value of the second color difference signal and either the second offset conversion characteristic or the third offset conversion characteristic, and a second offset converting section for converting the offset of the second color difference signal based on the second offset data.

Thus, the invention described herein makes possible the advantages of providing (1) a video signal processing apparatus capable of performing more delicate color adjustment; (2) a video signal processing apparatus capable of easily performing color adjustment by separately adjusting red, blue, and green; (3) a video signal processing apparatus capable of separately changing the gains of two color difference signal for each of red, blue, and green in accordance with user's settings; and (4) a video signal processing apparatus capable of separately changing the offsets of two color difference signal for each of red, blue, and green in accordance with user's settings.

These and other advantages of the present invention will become apparent to those skilled in the art upon reading and understanding the following detailed description with reference to the accompanying figures.

BRIEF DESCRIPTION OF THE DRAWINGS

FIG. 6B is a graph showing a relationship between the address value of a green gain and third gain data in Example 1.

DESCRIPTION OF THE PREFERRED EMBODIMENTS

Hereinafter, the present invention will be described by way of illustrative examples with reference to the accompanying drawings. In the examples, a video signal containing first and second color difference signals is reproduced from a disk-like medium.

EXAMPLE 1

Figure 1:
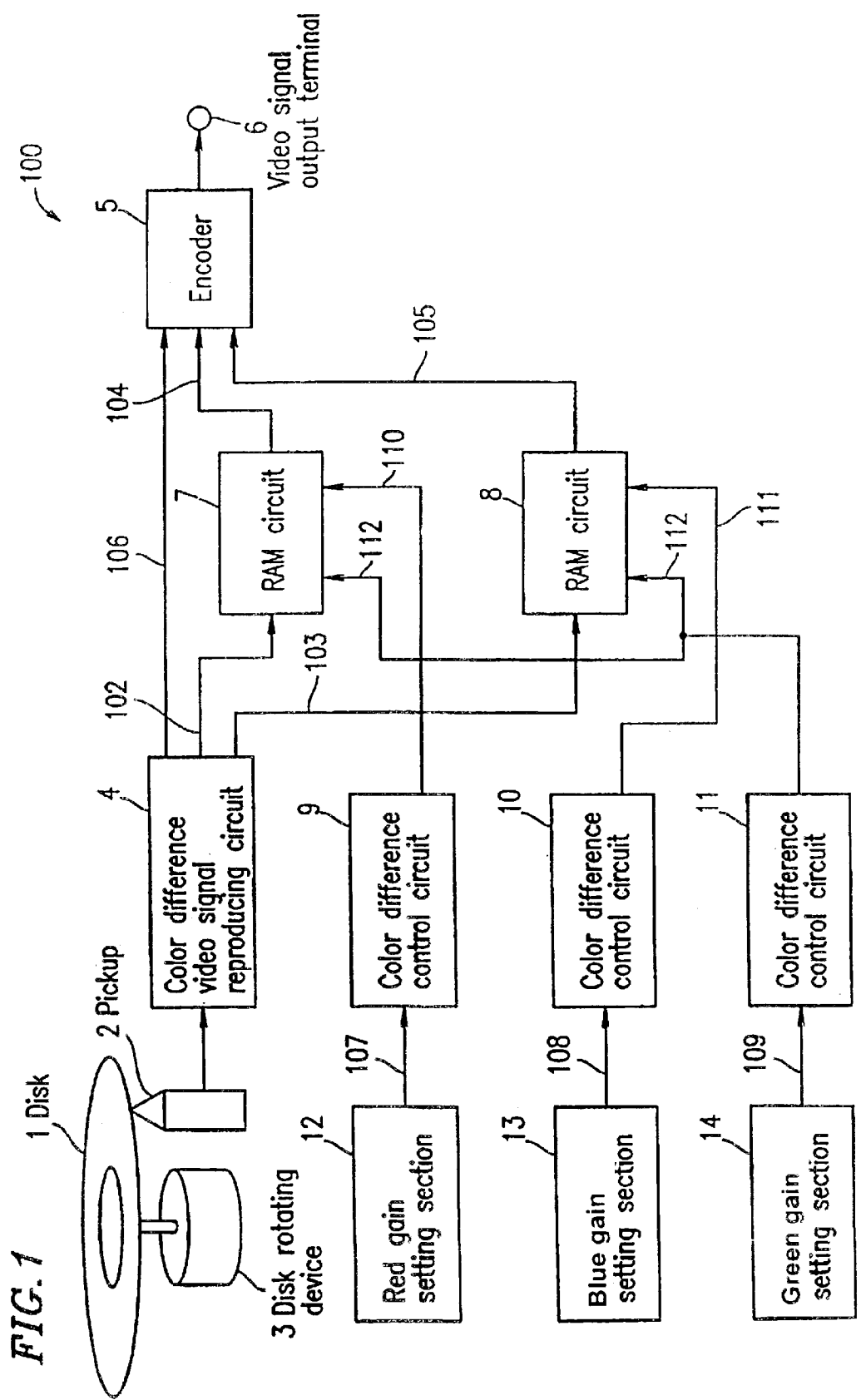
FIG. 1 is a block diagram showing a configuration of a video signal processing apparatus according to Example 1 of the present invention.

FIG. 1 is a block diagram showing a configuration of a video signal processing apparatus 100 according to Example 1 of the present invention. The video signal processing apparatus 100 includes a pickup 2, a color difference video signal reproducing circuit 4, a red gain setting section 12, a blue gain setting section 13, a green gain setting section 14, a color difference control circuit 9, a color difference control circuit 10, a color difference control circuit 11, a RAM circuit 7, a RAM circuit 8, an encoder 5, and a disk rotating device 3. The pickup 2 reads out a video signal from a disk 1 on which the video signal is previously recorded in the form of an encoded and modulated signal suitable for recording (or reproduction). The color difference video signal reproducing circuit 4 demodulates and decodes the video signal read out by the pickup 2, and outputs the resultant signal as a video signal containing first and second color difference signals 102 and 103 and a brightness signal 106. The red gain setting section 12 sets a red gain conversion characteristic 107 relevant to a saturation of red indicated by the first color difference signal 102. The blue gain setting section 13 sets a blue gain conversion characteristic 108 relevant to a saturation of blue indicated by the second color difference signal 103. The green gain setting section 14 sets a green gain conversion characteristic 109 relevant to a saturation of green indicated by the first and second color difference signals 102 and 103. The color difference control circuit 9 generates a signal 110 representing the red gain conversion characteristic 107 based on the red gain conversion characteristic 107 set by the red gain setting section 12. The color difference control circuit 10 generates a signal 111 representing the blue gain conversion characteristic 108 based on the blue gain conversion characteristic 108 set by the blue gain setting section 13. The color difference control circuit 11 generates a signal 112 representing the green gain conversion characteristic 109 based on the green gain conversion characteristic 109 set by the green gain setting section 14. The RAM circuit 7 converts the gain of the first color difference signal 102 based on the value of the received first color difference signal 102, the signal 110 representing the red gain conversion characteristic 107, and the signal 112 representing the green gain conversion characteristic 109, and outputs a gain-converted first color difference signal 104. The RAM circuit 8 converts the gain of the second color difference signal 103 based on the value of the received second color difference signal 103, the signal 111 representing the blue gain conversion characteristic 108, and the signal 112 representing the green gain conversion characteristic 109, and outputs a gain-converted second color difference signal 105. The encoder 5 generates an analog video signal suitable for display on a monitor (not shown) based on the first color difference signal 104 obtained by the gain conversion in the RAM circuit 7, the second color difference signal 105 obtained by the gain conversion in the RAM circuit 8, and the brightness signal 106 output by the color difference video signal reproducing circuit 4, and outputs the analog video signal through the video signal output terminal 6 to the monitor. The disk rotating device 3 drives the disk 1 at a rpm suitable for reproduction.

The red gain conversion characteristic 107, the blue gain conversion characteristic 108, and the green gain conversion characteristic 109 can be set in the red gain setting section 12, the blue gain setting section 13, and the green gain setting section 14, respectively. Specifically, the user can use these characteristics to set separately the red, blue, and green gain conversion characteristics (i.e., gain values) of a reproduced video signal.

Figure 2:
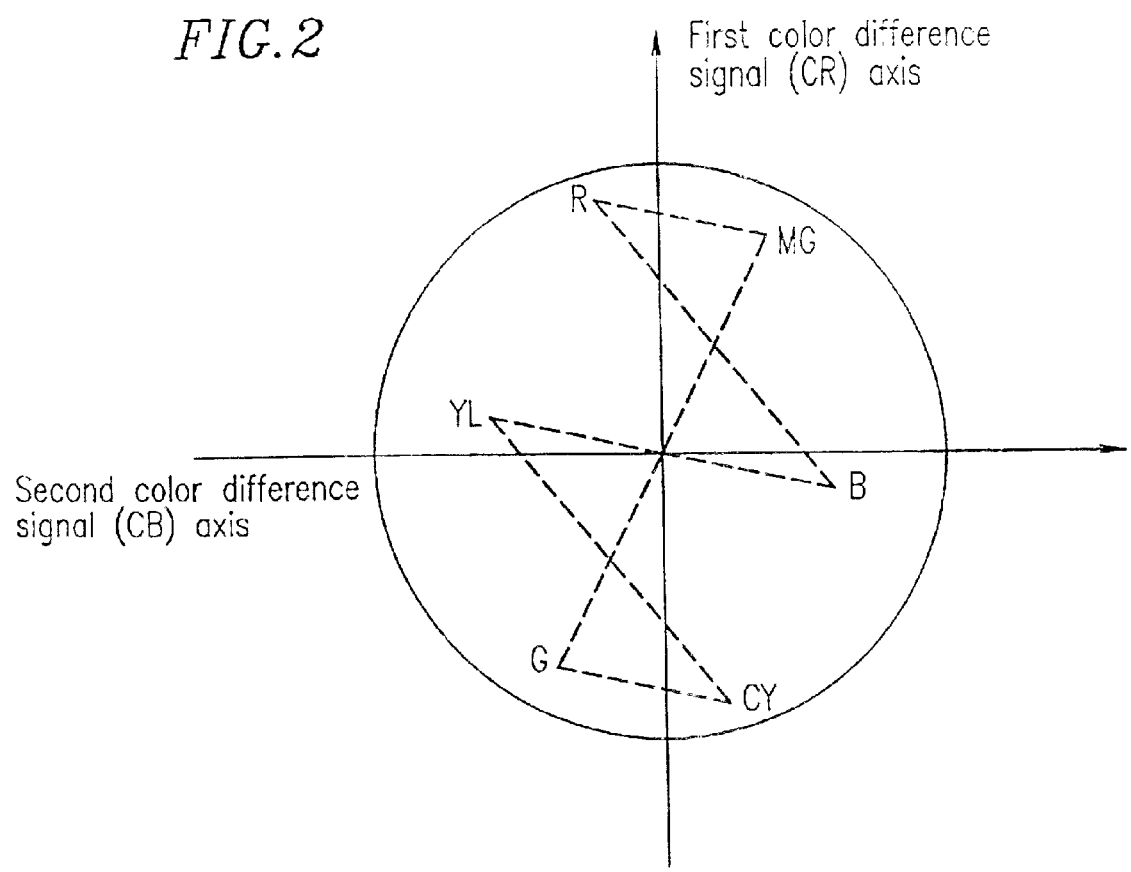
FIG. 2 is a schematic diagram showing a vector representing a color difference signal in Example 1.

FIG. 2 is a graph showing vectors of first and second color difference signals contained in a video signal to be processed by the video signal processing apparatus 100 according to Example 1 of the present invention.

Referring to FIG. 2, one of the two color difference signals is a first color difference signal (CR) corresponding to the vertical axis. The first color difference signal (CR) substantially represents red and cyan components. The other of the two color difference signals is a second color difference signal (CB) corresponding to the horizontal axis. The second color difference signal (CB) substantially represents blue and yellow components. As is well known, the hues and saturations of all colors are represented by vectors of the first and second color difference signals (CR and CB). The dashed line shown in FIG. 2 represents a trace of a vector on a standard color bar image. The reference letters at vertices, i.e., YL, CY, G, MG, R, and B represent the positions of vectors of yellow, cyan, green, magenta, red, and blue, respectively.

The first color difference signal (CR) has a median representing an achromatic color between red and cyan (plus or minus zero). A value more than or equal to the median of the first color difference signal (CR) represents a saturation of red indicating a color depth in the vicinity of red. A value more than or equal to the median of the second color difference signal (CB) (plus or minus zero) represents a saturation of blue indicating a color depth in the vicinity of blue. A value less than the median of the first color difference signal (CR) (plus or minus zero) and less than the median of the second color difference signal (CB) (plus or minus zero) represents a saturation of green indicating a color depth in the vicinity of green.

In FIG. 1, the disk 1 contains a progressive or interlace video signal recorded optically and compressed in the MPEG format. The video signal recorded in the disk 1 contains the brightness signal 106, the first color difference signal 102 (CR), and the second color difference signal 103 (CB).

The operation of the thus-constructed video signal processing apparatus 100 according to Example 1 of the present invention will be described below.

The disk rotating device 3 drives the disk 1 at a rpm suitable for reproduction. The pickup 2 reads a video signal recorded on the disk 1 optically and converts the video signal to an electrical signal which is in turn input to the color difference video signal reproducing circuit 4. The color difference video signal reproducing circuit 4 demodulates and decodes the electrical signal received from the pickup 2 and outputs a video signal containing the first and second color difference signals 102 and 103 and the brightness signal 106.

The user sets the red gain conversion characteristic 107 relevant to a saturation of red indicated by the first color difference signal 102 of the red gain setting section 12. The user sets the blue gain conversion characteristic 108 relevant to a saturation of blue indicated by the second color difference signal 103 of the blue gain setting section 13. The user sets the green gain conversion characteristic 109 relevant to a saturation of green indicated by the first and second color difference signals 102 and 103 of the green gain setting section 14. The gain setting sections 12, 13, and 14 each include a setting switch (not shown). The red gain conversion characteristic 107, the blue gain conversion characteristic 108, and the green gain conversion characteristic 109 can be set by selecting any one of seven levels of gain conversion characteristics. Thus, the user can set the gain conversion characteristics for red, blue, and green separately using the red gain setting section 12, the blue gain setting section 13, and the green gain setting section 14.

The color difference control circuit 9 generates the signal 110 representing the red gain conversion characteristic 107 based on the red gain conversion characteristic 107. The color difference control circuit 10 generates the signal 111 representing the blue gain conversion characteristic 108 based on the blue gain conversion characteristic 108. The color difference control circuit 11 generates the signal 112 representing the green gain conversion characteristic 109 based on the green gain conversion characteristic 109.

Figure 3:
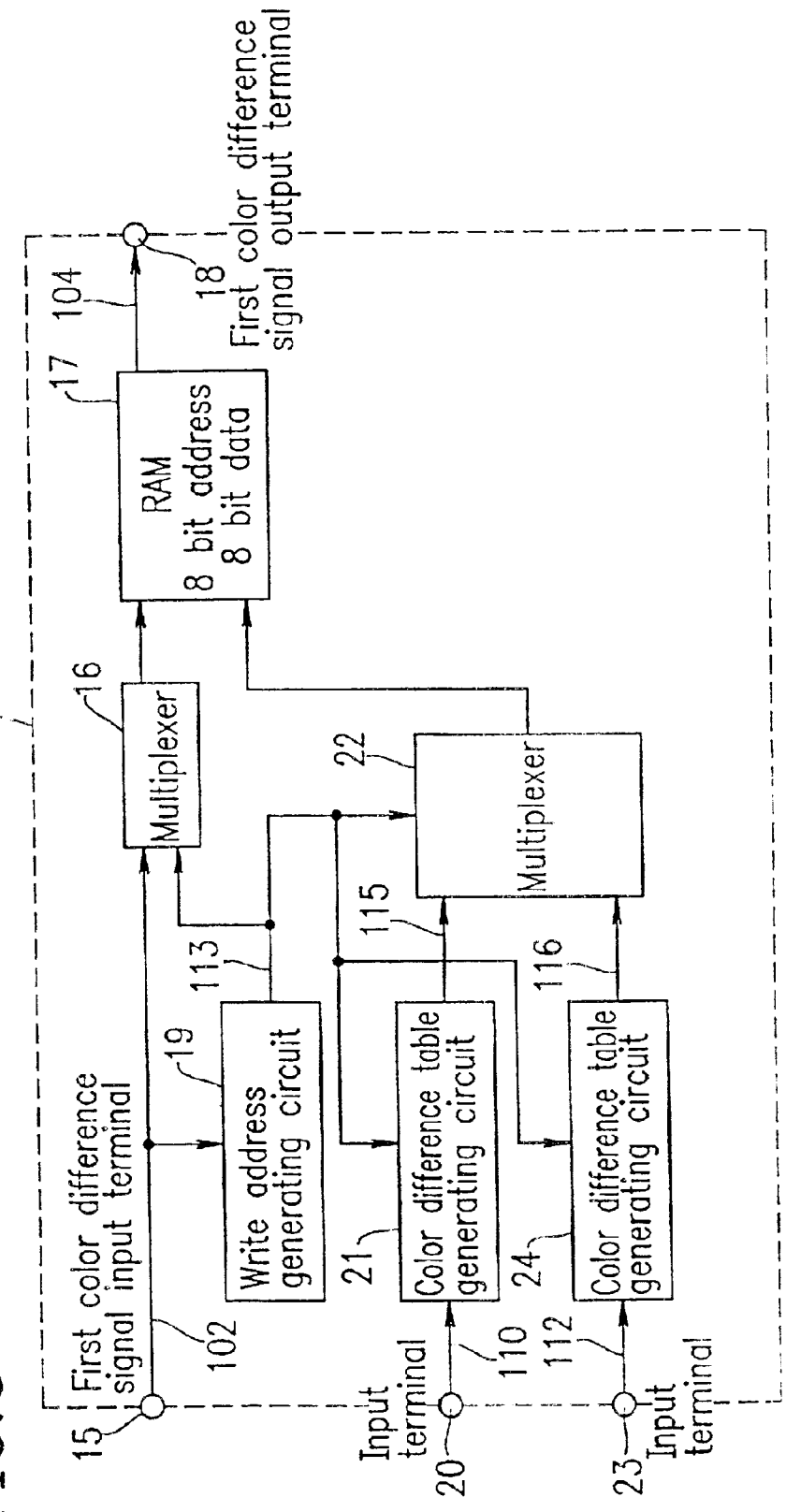
FIG. 3 is a block diagram showing a configuration of a RAM circuit in Example 1.

Next, a configuration and an operation of the RAM circuit 7 included in the video signal processing apparatus 100 will be described below. FIG. 3 shows a configuration of the RAM circuit 7.

The RAM circuit 7 includes a first color difference signal input terminal 15, a write address generating circuit 19, an input terminal 20, an input terminal 23, a color difference table generating circuit 21, a color difference table generating circuit 24, a multiplexer 22, a multiplexer 16, and a RAM 17. The first color difference signal input terminal 15 receives the first color difference signal 102 (CR) from the color difference video signal reproducing circuit 4 (FIG. 1). The write address generating circuit 19 generates an address value 113 of 8 bits based on the value of the received first color difference signal 102. The input terminal 20 receives the signal 110 representing the red gain conversion characteristic 107 from the color difference control circuit 9 (FIG. 1). The input terminal 23 receives the signal 112 representing the green gain conversion characteristic 109 from the color difference control circuit 11 (FIG. 1). The color difference table generating circuit 21 generates first gain data 115 based on the address value 113 and the signal 110 representing the red gain conversion characteristic 107. The color difference table generating circuit 24 generates second gain data 116 based on the address value 113 and the signal 112 representing the green gain conversion characteristic 109. The multiplexer 22 selects either the first gain data 115 or the second gain data 116 based on the address value 113. The multiplexer 16 switches between the first color difference signal 102 and the address value 113. The RAM 17 converts the gain of the first color difference signal 102 based on either the first gain data 115 or the second gain data 116 selected by the multiplexer 22, and outputs the gain-converted first color difference signal 102 through the first color difference signal output terminal 18 to the encoder 5 (FIG. 1).

When the first color difference signal input terminal 15 receives the first color difference signal 102 (CR) from the color difference video signal reproducing circuit 4 (FIG. 1), the write address generating circuit 19 generates the address value 113 of 8 bits based on the value of the received first color difference signal 102. The color difference table generating circuit 21 generates the first gain data 115 based on the address value 113 and the signal 110 representing the red gain conversion characteristic 107. The color difference table generating circuit 24 generates the second gain data 116 based on the address value 113 and the signal 112 representing the green gain conversion characteristic 109. The multiplexer 22 selects either the first gain data 115 or the second gain data 116 based on the address value 113. The multiplexer 16 selects and outputs the address value 113 to an address of the RAM 17. The first or second gain data 115 or 116 selected by the multiplexer 22 is written into the RAM 17 based on the address value 113. This write operation is carried out during a vertical scanning period for a video signal. The multiplexer 16 selects and outputs the first color difference signal 102 to the RAM 17. The gain of the first color difference signal 102 is converted based on the first or second gain data 115 or 116 held in the RAM 17, and the converted first color difference signal 102 is output as the first color difference signal 104 through the first color difference signal output terminal 18 to the encoder 5.

Figure 4A:
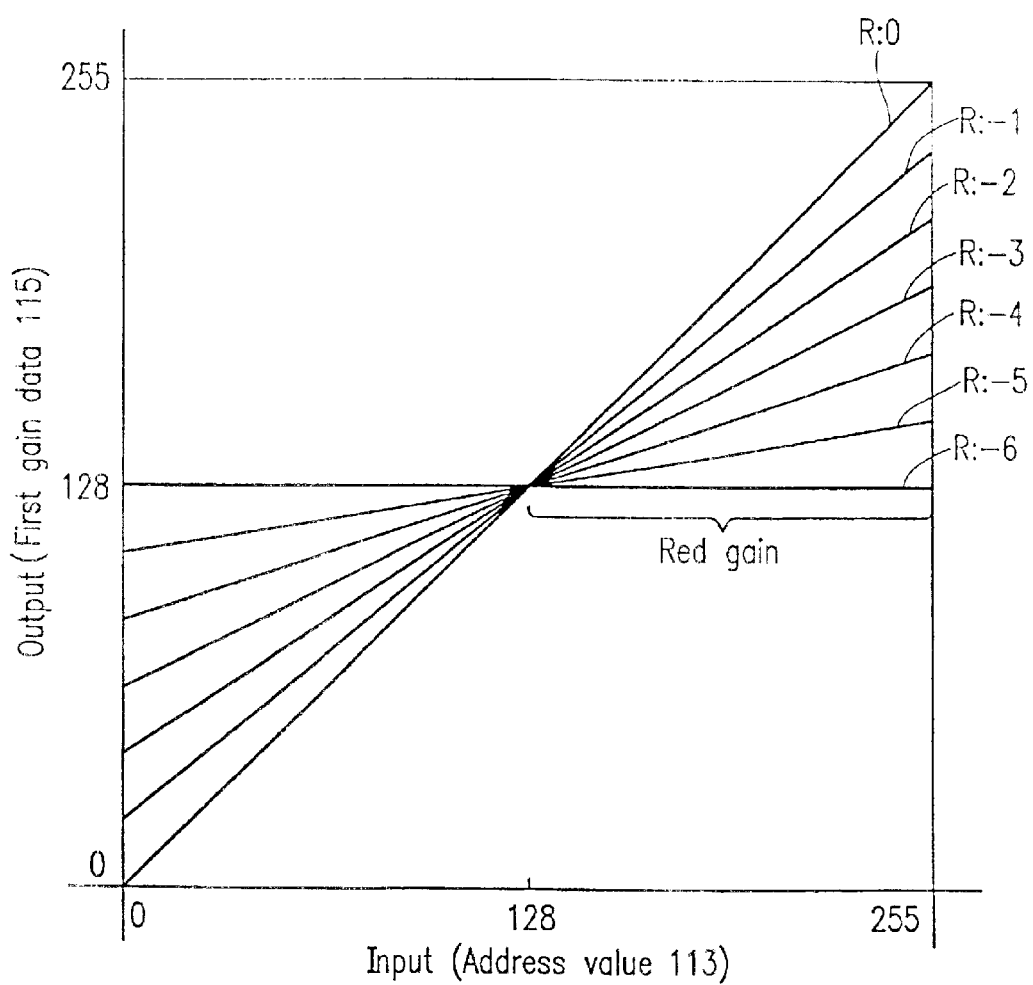
FIG. 4A is a graph showing a relationship between the address value of a red gain and first gain data in Example 1.
Figure 4B:
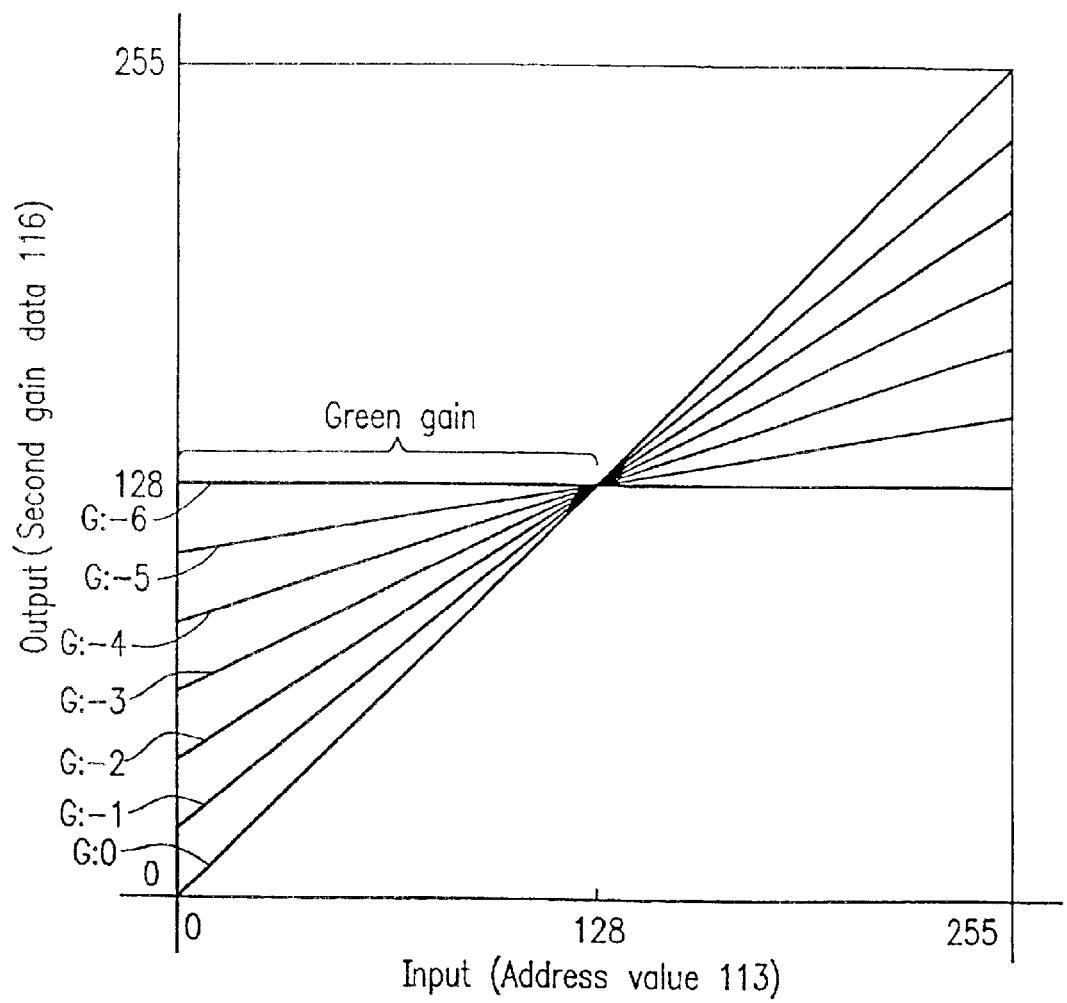
FIG. 4B is a graph showing a relationship between the address value of a green gain and first gain data in Example 1.

FIG. 4A is a graph showing a relationship among a red gain, the address value 113, and the first gain data 115 in Example 1. FIG. 4B is a graph showing a relationship among a green gain, the address value 113, and the second gain data 116 in Example 1.

In FIG. 3, the signal 110 representing the red gain conversion characteristic 107 set by the red gain setting section 12 is input through the input terminal 20 to the RAM circuit 7. The signal 110 representing the red gain conversion characteristic 107 indicates one of red gain characteristics R:0, R:−1, R:−2, R:−3, R:−4, R:−5, and R:−6 shown in FIG. 4A.

As described with reference to FIG. 2, the median of the first color difference signal (CR) represents an achromatic color while a value more than or equal to the median substantially represents a saturation of red. The color difference table generating circuit 21 generates the first gain data 115 based on the address value 113 and one of the red gain characteristics R:0, R:−1, R:−2, R:−3, R:−4, R:−5, and R:−6 shown in FIG. 4A, thereby controlling a color depth in the vicinity of red. In FIG. 4A, the red gain characteristic R:0 represents an original gain, and the red gain characteristics R:−1, R:−2, R:−3, R:−4, and R:−5 decreases in this order. The red gain characteristic R:−6 has a gain of zero. The first color difference signal 102 (CR) is digital data of 8 bits. Therefore, the address value 113 in the range from 128 to 255 substantially represents a saturation of red.

In FIG. 3, when the signal 110 representing the red gain conversion characteristic 107 set by the red gain setting section 12 is input through the input terminal 20 to the RAM circuit 7, the color difference table generating circuit 21 generates the first gain data 115 based on one of the red gain characteristics R:0, R:−1, R:−2, R:−3, R:−4, R:−5, and R:−6 indicated by the signal 110 representing the red gain conversion characteristic 107. For example, when the signal 110 representing the red gain conversion characteristic 107 indicates the red gain characteristic R:−3, the color difference table generating circuit 21 generates the first gain data 115 from the address value 113 based on the red gain characteristic R:−3.

In FIG. 3, the signal 112 representing the green gain conversion characteristic 109 set by the green gain setting section 14 is input through the input terminal 23 to the RAM circuit 7. The signal 112 representing the green gain conversion characteristic 109 indicates one of green gain characteristics G:0, G:−1, G:−2, G:−3, G:−4, G:−5, and G:−6 shown in FIG. 4B.

As described with reference to FIG. 2, the median of the first color difference signal (CR) represents an achromatic color while a value less than the median substantially represents a saturation of green. The color difference table generating circuit 24 generates the second gain data 116 based on the address value 113 and one of the green gain characteristics G:0, G:−1, G:−2, G:−3, G:−4, G:−5, and G:−6 shown in FIG. 4B, thereby controlling a color depth in the vicinity of green. In FIG. 4B, the green gain characteristic G:0 represents an original gain, and the green gain characteristics G:−1, G:−2, G:−3, G:−4, and G:−5 decreases in this order. The green gain characteristic G:−6 has a gain of zero. The first color difference signal 102 (CR) is digital data of 8 bits. Therefore, the address value 113 in the range from 0 to 127 substantially represents a saturation of green.

In FIG. 3, when the signal 112 representing the green gain conversion characteristic 109 set by the green gain setting section 14 is input through the input terminal 23 to the RAM circuit 7, the color difference table generating circuit 24 generates the second gain data 116 based on one of the green gain characteristics G:0, G:−1, G:−2, G:−3, G:−4, G:−5, and G:−6 indicated by the signal 112 representing the green gain conversion characteristic 109. For example, when the signal 112 representing the green gain conversion characteristic 109 indicates the green gain characteristic G:−3, the color difference table generating circuit 24 generates the second gain data 116 from the address value 113 based on the green gain characteristic G:−3.

Figure 5:
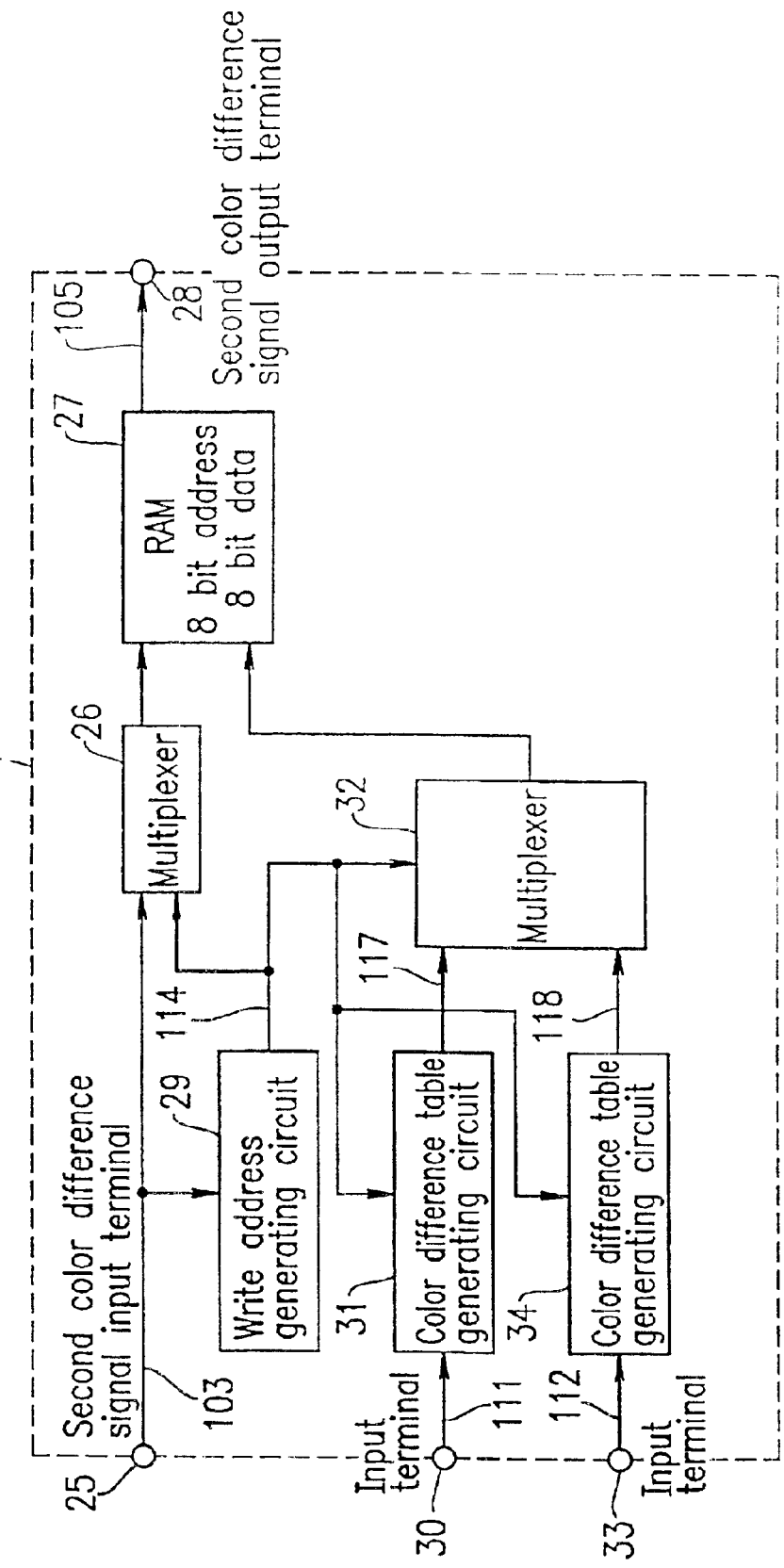
FIG. 5 is a block diagram showing a configuration of another RAM circuit in Example 1.

Similarly, a configuration and an operation of the RAM circuit 8 included in the video signal processing apparatus 100 will be described below. FIG. 5 shows a configuration of the RAM circuit 8.

The RAM circuit 8 includes a second color difference signal input terminal 25, a write address generating circuit 29, an input terminal 30, an input terminal 33, a color difference table generating circuit 31, a color difference table generating circuit 34, a multiplexer 32, a multiplexer 26, and a RAM 27. The second color difference signal input terminal 25 receives the second color difference signal 103 (CB) from the color difference video signal reproducing circuit 4 (FIG. 1). The write address generating circuit 29 generates an address value 114 of 8 bits based on the value of the received second color difference signal 103. The input terminal 30 receives the signal 111 representing the blue gain conversion characteristic 108 from the color difference control circuit 10 (FIG. 1). The input terminal 33 receives the signal 112 representing the green gain conversion characteristic 109 from the color difference control circuit 11 (FIG. 1). The color difference table generating circuit 31 generates third gain data 117 based on the address value 114 and the signal 111 representing the blue gain conversion characteristic 108. The color difference table generating circuit 34 generates fourth gain data 118 based on the address value 114 and the signal 112 representing the green gain conversion characteristic 109. The multiplexer 32 selects either the third gain data 117 or the fourth gain data 118. The multiplexer 26 switches between the second color difference signal 103 and the address value 114. The RAM 27 converts the gain of the second color difference signal 103 based on either the third gain data 117 or the fourth gain data 118 selected by the multiplexer 32, and outputs the gain-converted second color difference signal 103 through the second color difference signal output terminal 28 to the encoder 5 (FIG. 1).

When the second color difference signal input terminal 25 receives the second color difference signal 103 (CB) from the color difference video signal reproducing circuit 4 (FIG. 1), the write address generating circuit 29 generates the address value 114 of 8 bits based on the value of the received second color difference signal 103. The color difference table generating circuit 31 generates the third gain data 117 based on the address value 114 and the signal 111 representing the blue gain conversion characteristic 108. The color difference table generating circuit 34 generates the fourth gain data 118 based on the address value 114 and the signal 112 representing the green gain conversion characteristic 109. The multiplexer 32 selects either the third gain data 117 or the fourth gain data 118 based on the address value 114. The multiplexer 26 selects and outputs the address value 114 to an address of the RAM 27. The third or fourth gain data 117 or 118 selected by the multiplexer 32 is written into the RAM 27 based on the address value 114. This write operation is carried out during a vertical scanning period for a video signal. The multiplexer 26 selects and outputs the second color difference signal 103 to the RAM 27. The gain of the second color difference signal 103 is converted based on the third or fourth gain data 117 or 118 held in the RAM 27, and the converted second color difference signal 103 is output as the second color difference signal 105 through the second color difference signal output terminal 28 to the encoder 5.

Figure 6A:
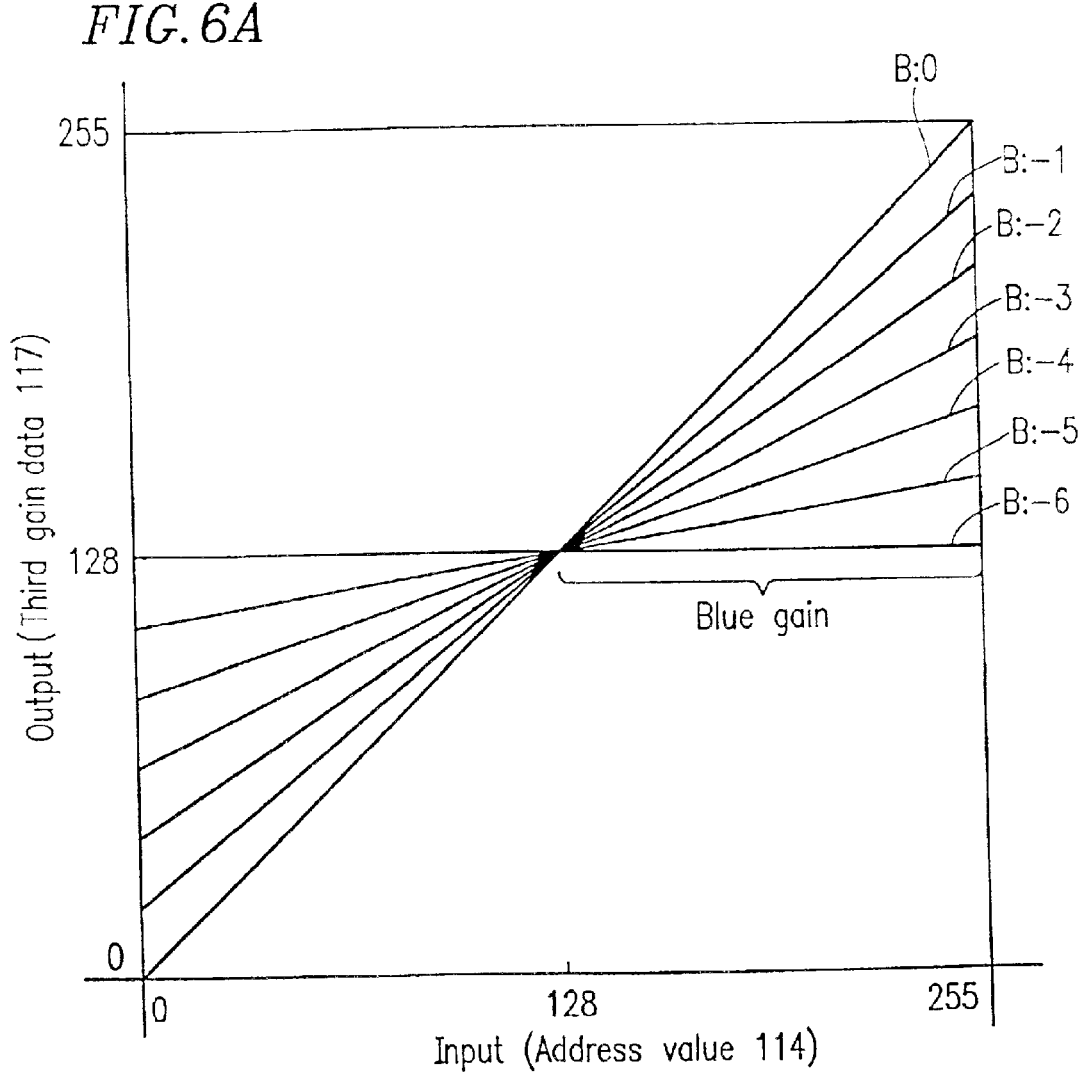
FIG. 6A is a graph showing a relationship between the address value of a blue gain and third gain data in Example 1.

FIG. 6A is a graph showing a relationship among a blue gain, the address value 114, and the third gain data 117 in Example 1. FIG. 6B is a graph showing a relationship among a green gain, the address value 114, and the fourth gain data 118 in Example 1.

In FIG. 5, the signal 111 representing the blue gain conversion characteristic 108 set by the blue gain setting section 13 is input through the input terminal 30 to the RAM circuit 8. The signal 111 representing the blue gain conversion characteristic 108 indicates one of blue gain characteristics B:0, B:−1, B:−2, B:−3, B:−4, B:−5, and B:−6 shown in FIG. 6A.

As described with reference to FIG. 2, the median of the second color difference signal (CB) represents an achromatic color while a value more than or equal to the median substantially represents a saturation of blue. The color difference table generating circuit 31 generates the third gain data 117 based on the address value 114 and one of the blue gain characteristics B:0, B:−1, B:−2, B:−3, B:−4, B:−5, and B:−6 shown in FIG. 6A, thereby controlling a color depth in the vicinity of blue. In FIG. 6A, the blue gain characteristic B:0 represents an original gain, and the blue gain characteristics B:−1, B:−2, B:−3, B:−4, and B:−5 decreases in this order. The blue gain characteristic B:−6 has a gain of zero. The second color difference signal 103 (CB) is digital data of 8 bits. Therefore, the address value 114 in the range from 128 to 255 substantially represents a saturation of blue.

In FIG. 5, when the signal 111 representing the blue gain conversion characteristic 108 set by the blue gain setting section 13 is input through the input terminal 30 to the RAM circuit 8, the color difference table generating circuit 31 generates the third gain data 117 based on one of the blue gain characteristics B:0, B:−1, B:−2, B:−3, B:−4, B:−5, and B:−6 indicated by the signal 111 representing the blue gain conversion characteristic 108. For example, when the signal 111 representing the blue gain conversion characteristic 108 indicates the blue gain characteristic B:−3, the color difference table generating circuit 31 generates the third gain data 117 from the address value 114 based on the blue gain characteristic B:−3.

In FIG. 5, the signal 112 representing the green gain conversion characteristic 109 set by the green gain setting section 14 is input through the input terminal 33 to the RAM circuit 8. The signal 112 representing the green gain conversion characteristic 109 indicates one of green gain characteristics G:0, G:−1, G:−2, G:−3, G:−4, G:−5, and G:−6 shown in FIG. 6B.

As described with reference to FIG. 2, the median of the second color difference signal 103 (CB) represents an achromatic color while a value less than the median substantially represents a saturation of green. The color difference table generating circuit 34 generates the fourth gain data 118 based on the address value 114 and one of the green gain characteristics G:0, G:−1, G:−2, G:−3, G:−4, G:−5, and G:−6 shown in FIG. 6B, thereby controlling a color depth in the vicinity of green. In FIG. 6B, the green gain characteristic G:0 represents an original gain, and the green gain characteristics G:−1, G:−2, G:−3, G:−4, and G:−5 decreases in this order. The green gain characteristic G:−6 has a gain of zero. The second color difference signal 103 (CB) is digital data of 8 bits. Therefore, the address value 114 in the range from 0 to 127 substantially represents a saturation of green.

In FIG. 5, when the signal 112 representing the green gain conversion characteristic 109 set by the green gain setting section 14 is input through the input terminal 33 to the RAM circuit 8, the color difference table generating circuit 34 generates the fourth gain data 118 based on one of the green gain characteristics G:0, G:−1, G:−2, G:−3, G:−4, G:−5, and G:−6 indicated by the signal 112 representing the green gain conversion characteristic 109. For example, when the signal 112 representing the green gain conversion characteristic 109 indicates the green gain characteristic G:−3, the color difference table generating circuit 34 generates the fourth gain data 118 from the address value 114 based on the green gain characteristic G:−3.

Thus, when the red gain conversion characteristic 107 is set in the red gain setting section 12 (FIG. 1), the color difference table generating circuit 21 (FIG. 3) generates the first gain data 115 based on the address value 113 based on the value of the received first color difference signal 102 and one of the red gain characteristics R:0, R:−1, R:−2, R:−3, R:−4, R:−5, and R:−6 (FIG. 4A) indicated by the signal 110 representing the red gain conversion characteristic 107. When the green gain conversion characteristic 109 is set in the green gain setting section 14 (FIG. 1), the color difference table generating circuit 24 (FIG. 3) generates the second gain data 116 based on the address value 113 based on the value of the received first color difference signal 102 and one of the green gain characteristics G:0, G:−1, G:−2, G:−3, G:−4, G:−5, and G:−6 (FIG. 4B) indicated by the signal 112 representing the green gain conversion characteristic 109.

Referring to FIG. 3, when the address value 113 is in the range from 128 or more to 255 or less, the multiplexer 22 selects the first gain data 115 generated by the color difference table generating circuit 21. The RAM 17 converts the gain of the first color difference signal based on the first gain data 115. When the address value 113 is in the range from 0 or more to 127 or less, the multiplexer 22 selects the second gain data 116 generated by the color difference table generating circuit 24. The RAM 17 converts the gain of the first color difference signal 102 based on the second gain data 116.

When the blue gain conversion characteristic 108 is set in the blue gain setting section 13 (FIG. 1), the color difference table generating circuit 31 (FIG. 5) generates the third gain data 117 based on the address value 114 based on the value of the received second color difference signal 103 and one of the blue gain characteristics B:0, B:−1, B:−2, B:−3, B:−4, B:−5, and B:−6 (FIG. 6A) indicated by the signal 111 representing the blue gain conversion characteristic 108. When the green gain conversion characteristic 109 is set in the green gain setting section 14 (FIG. 1), the color difference table generating circuit 34 (FIG. 5) generates the fourth gain data 118 based on the address value 114 based on the value of the received second color difference signal 103 and one of the green gain characteristics G:0, G:−1, G:−2, G:−3, G:−4, G:−5, and G:−6 (FIG. 6B) indicated by the signal 112 representing the green gain conversion characteristic 109.

Referring to FIG. 5, when the address value 114 is in the range from 128 or more to 255 or less, the multiplexer 32 selects the third gain data 117 generated by the color difference table generating circuit 31. The RAM 27 converts the gain of the second color difference signal 103 based on the third gain data 117. When the address value 114 is in the range from 0 or more to 127 or less, the multiplexer 32 selects the fourth gain data 118 generated by the color difference table generating circuit 34. The RAM 27 converts the gain of the second color difference signal 103 based on the fourth gain data 118.

Referring to FIG. 1, the encoder 5 generates a video signal based on the first color difference signal 104 whose gain has been converted by the RAM circuit 7, the second color difference signal 105 whose gain has been converted by the RAM circuit 8, and the brightness signal 106 such that the video signal is suited to display on a monitor (not shown). Specifically, the encoder 5 adds a synchronization signal to the received digital brightness signal 106 and outputs the resultant signal as an analog brightness signal. The gain-converted first color difference signal 104 (CR) and the gain-converted second color difference signal 105 (CB) are also converted to analog signals which are output from the encoder 5. In the case where the video signal recorded on the disk 1 is of a progressive type (480P), a progressive color difference signal is also output. Moreover, the gain-converted first color difference signal 104 (CR) and the gain-converted second color difference signal 105 (CB) are modulated using a color sub-carrier to generate a color signal. The color signal, the brightness signal, and a synchronization signal are combined to generate a composite video signal. The thus-generated analog brightness signal, color difference signal, color signal, and composite video signal are output from the video signal output terminal 6.

Figure 7:
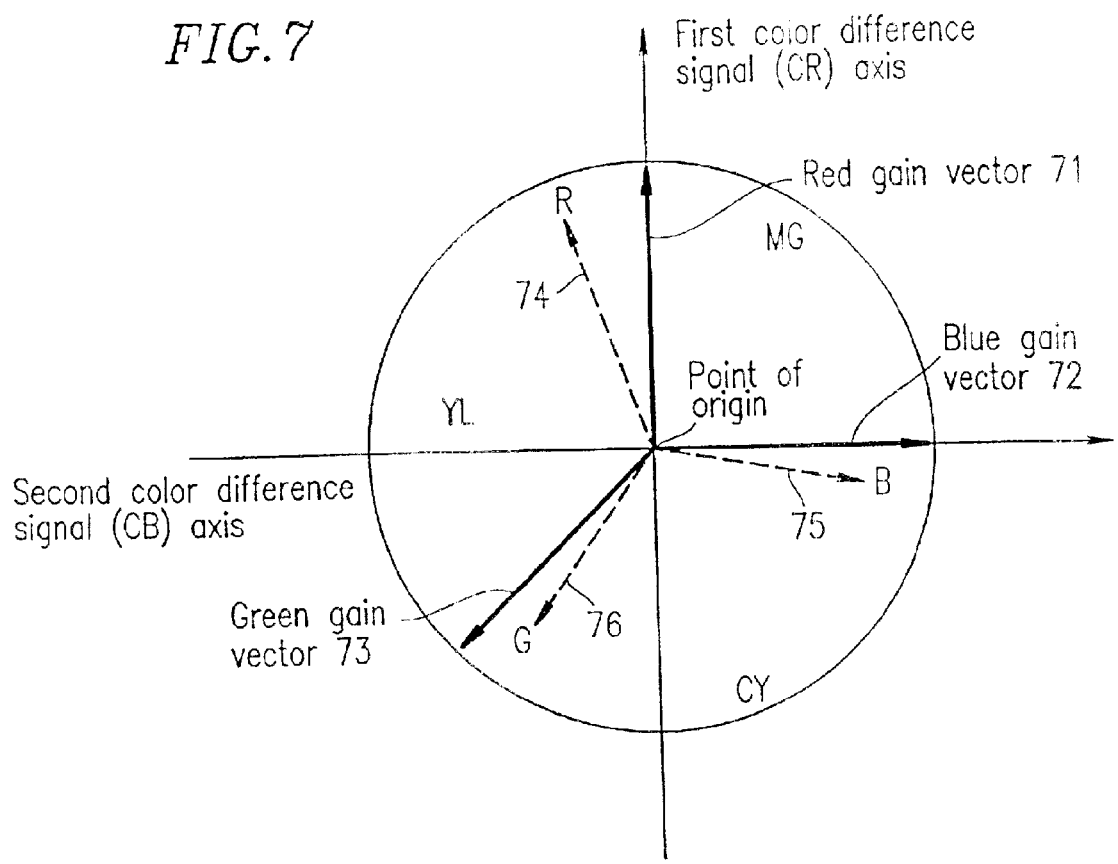
FIG. 7 is a schematic diagram showing gains of red, blue, and green in Example 1.

FIG. 7 is a schematic diagram showing a red gain vector, a blue gain vector, and a green gain vector in the video signal processing apparatus 100 according to Example 1 of the present invention.

Referring to FIG. 7, the lengths of a red gain vector 71, a blue gain vector 72, and a green gain vector 73 (represented by arrows) indicate the sizes of a red gain, a blue gain, and a green gain, respectively. Reducing a gain corresponds to shortening the length of an arrow whose starting point is placed at the point of origin. The red gain vector 71, the blue gain vector 72, and the green gain vector 73 have directions which are substantially equal to the directions of a red vector 74, a blue vector 75, and a green vector 76. This shows that a red color, a blue color, and a green color can be separately adjusted using the red gain vector 71, the blue gain vector 72, and the green gain vector 73. Therefore, a red color, a blue color, and a green color can be separately adjusted for a number of types of monitors and, particularly, for a monitor capable of receiving progressive video.

As described above, the present invention can provide a video signal processing apparatus capable of performing more delicate color adjustment by changing a red gain, a blue gain, and a green gain separately in accordance with the user's settings.

EXAMPLE 2

Figure 8:
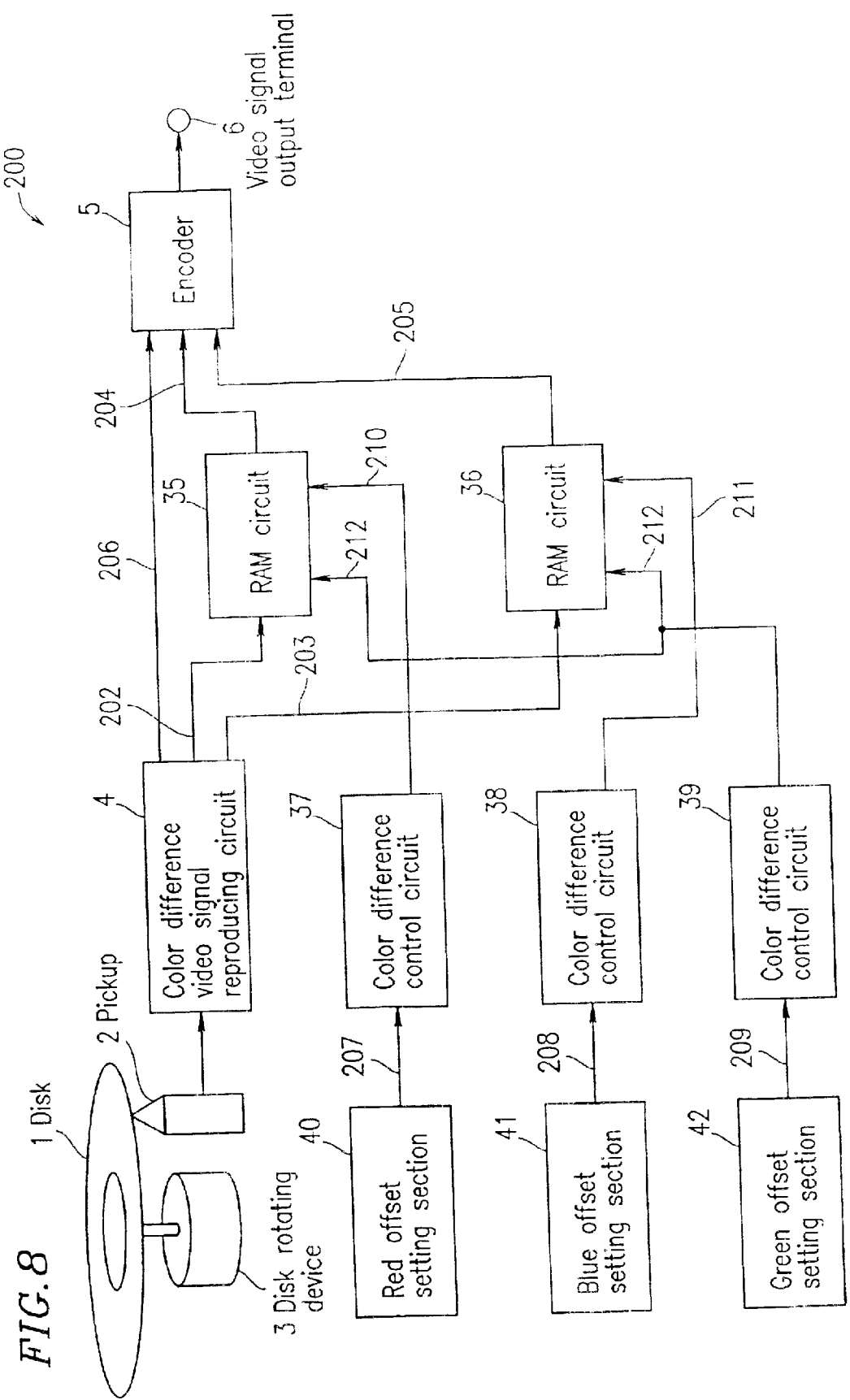
FIG. 8 is a block diagram showing a configuration of a video signal processing apparatus according to Example 2 of the present invention.

Hereinafter, a video signal processing apparatus according to Example 2 of the present invention will be described with reference to FIGS. 8 through 14. FIG. 8 is a block diagram showing a configuration of a video signal processing apparatus 200 according to Example 2 of the present invention. The same components as those of Example 1 shown in FIG. 1 are designated by the same reference numerals, and the description thereof is thus omitted.

The video signal processing apparatus 200 includes a pickup 2, a color difference video signal reproducing circuit 4, a red offset setting section 40, a blue offset setting section 41, a green offset setting section 42, a first color difference control section 37, a color difference control circuit 38, a color difference control circuit 39, a RAM circuit 35, a RAM circuit 36, an encoder 5, and a disk rotating device 3. The pickup 2 reads out a video signal from a disk 1 on which the video signal is previously recorded in the form of an encoded and modulated signal suitable for recording (or reproduction). The color difference video signal reproducing circuit 4 demodulates and decodes the video signal read out by the pickup 2, and outputs the resultant signal as a video signal containing first and second color difference signals 202 and 203 and a brightness signal 206. The red offset setting section 40 sets a red offset conversion characteristic 207 relevant to a saturation of red indicated by the first color difference signal 202. The blue offset setting section 41 sets a blue offset conversion characteristic 208 relevant to a saturation of blue indicated by the second color difference signal 203. The green offset setting section 42 sets a green offset conversion characteristic 209 relevant to a saturation of green indicated by the first and second color difference signals 202 and 203. The color difference control circuit 37 generates a signal 210 representing the red offset conversion characteristic 207 based on the red offset conversion characteristic 207 set by the red offset setting section 40. The color difference control circuit 38 generates a signal 211 representing the blue offset conversion characteristic 208 based on the blue offset conversion characteristic 208 set by the blue offset setting section 41. The color difference control circuit 39 generates a signal 212 representing the green offset conversion characteristic 209 based on the green offset conversion characteristic 209 set by the green offset setting section 42. The RAM circuit 35 converts the gain of the first color difference signal 202 based on the value of the received first color difference signal 202, the signal 210 representing the red offset conversion characteristic 207, and the signal 212 representing the green offset conversion characteristic 209, and outputs a gain-converted first color difference signal 204. The RAM circuit 36 converts the gain of the second color difference signal 203 based on the value of the received second color difference signal 203, the signal 211 representing the blue offset conversion characteristic 208, and the signal 212 representing the green offset conversion characteristic 209, and outputs a gain-converted second color difference signal 205. The encoder 5 generates an analog video signal suitable for display on a monitor (not shown) based on the first color difference signal 204 obtained by the gain conversion in the RAM circuit 35, the second color difference signal 205 obtained by the gain conversion in the RAM circuit 36, and the brightness signal 206 output by the color difference video signal reproducing circuit 4, and outputs the analog video signal through the video signal output terminal 6 to the monitor. The disk rotating device 3 drives the disk 1 at a rpm suitable for reproduction.

The red offset conversion characteristic 207, the blue offset conversion characteristic 208, and the green offset conversion characteristic 209 can be set in the red offset setting section 40, the blue offset setting section 41, and the green offset setting section 42, respectively. Specifically, the user can use these characteristics to set separately the red, blue, and green offset conversion characteristics (i.e., offset values) of a reproduced video signal.

Figure 9:
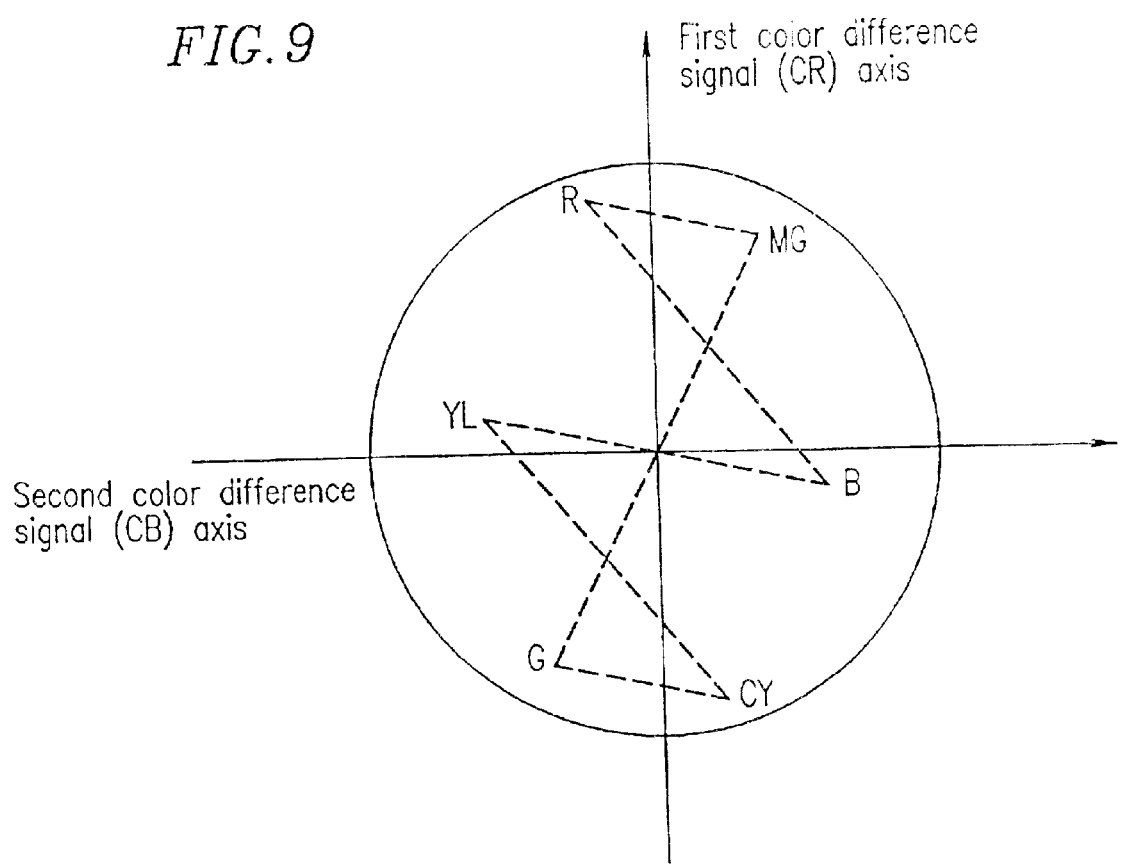
FIG. 9 is a schematic diagram showing a vector representing a color difference signal in Example 2.

FIG. 9 is a graph showing vectors of first and second color difference signals contained in a video signal processed by the video signal processing apparatus 200 according to Example 2 of the present invention.

Referring to FIG. 9, one of the two color difference signals is a first color difference signal (CR) corresponding to the vertical axis. The first color difference signal (CR) substantially represents red and cyan components. The other of the two color difference signals is a second color difference signal (CB) corresponding to the horizontal axis. The second color difference signal (CB) substantially represents blue and yellow components. As is well known, the hues and saturations of all colors are represented by vectors of the first and second color difference signals (CR and CB). The dashed line shown in FIG. 9 represents a trace of a vector on a standard color bar image. The reference letters at vertices, i.e., YL, CY, G, MG, R, and B represent the positions of vectors of yellow, cyan, green, magenta, red, and blue, respectively.

The first color difference signal (CR) has a median representing an achromatic color between red and cyan (plus or minus zero). A value more than or equal to the median of the first color difference signal (CR) represents a saturation of red indicating a color depth in the vicinity of red. A value more than or equal to the median of the second color difference signal (CB) (plus or minus zero) represents a saturation of blue indicating a color depth in the vicinity of blue. A value less than the median of the first color difference signal (CR) (plus or minus zero) and less than the median of the second color difference signal (CB) represents a saturation of green indicating a color depth in the vicinity of green.

In FIG. 8, the disk 1 contains a progressive or interlace video signal recorded optically and compressed in the MPEG format. The video signal recorded in the disk 1 contains the brightness signal 206, the first color difference signal 202 (CR), and the second color difference signal 203 (CB).

The operation of the thus-constructed video signal processing apparatus 200 according to Example 2 of the present invention will be described below.

The disk rotating device 3 drives the disk 1 at a rpm suitable for reproduction. The pickup 2 reads a video signal recorded on the disk 1 optically and converts the video signal to an electrical signal which is in turn input to the color difference video signal reproducing circuit 4. The color difference video signal reproducing circuit 4 demodulates and decodes the electrical signal received from the pickup 2 and outputs a video signal containing the first and second color difference signals 202 and 203 and the brightness signal 206.

The user sets the red offset conversion characteristic 207 relevant to a saturation of red indicated by the first color difference signal 202 of the red offset setting section 40. The user sets the blue offset conversion characteristic 208 relevant to a saturation of blue indicated by the second color difference signal 203 of the blue offset setting section 41. The user sets the green offset conversion characteristic 209 relevant to a saturation of green indicated by the first and second color difference signals 202 and 203 of the green offset setting section 42. The gain setting sections 40, 41, and 42 each include a setting switch (not shown). The red offset conversion characteristic 207, the blue offset conversion characteristic 208, and the green offset conversion characteristic 209 can be set by selecting any one of seven levels of gain conversion characteristics. Thus, the user can set the gain conversion characteristics for red, blue, and green separately using the red offset setting section 40, the blue offset setting section 41, and the green offset setting section 42.

The color difference control circuit 37 generates the signal 210 representing the red offset conversion characteristic 207 based on the red offset conversion characteristic 207. The color difference control circuit 38 generates the signal 211 representing the blue offset conversion characteristic 208 based on the blue offset conversion characteristic 208. The color difference control circuit 39 generates the signal 212 representing the green offset conversion characteristic 209 based on the green offset conversion characteristic 209.

Figure 10:
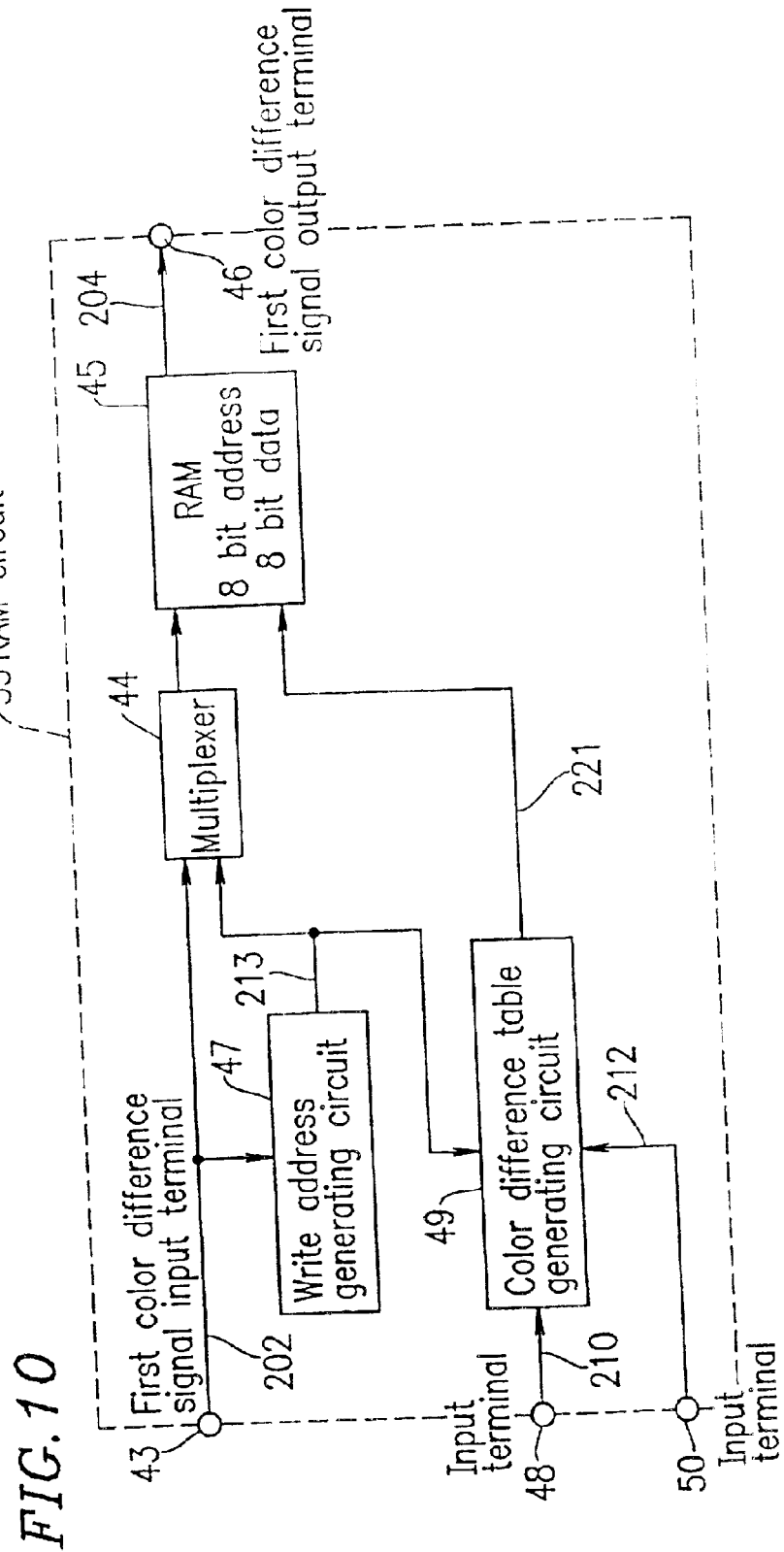
FIG. 10 is a block diagram showing a configuration of a RAM circuit in Example 2.

Next, a configuration and an operation of the RAM circuit 35 included in the video signal processing apparatus 200 will be described below. FIG. 10 shows a configuration of the RAM circuit 35.

The RAM circuit 35 includes a first color difference signal input terminal 43, a write address generating circuit 47, an input terminal 48, an input terminal 50, a color difference table generating circuit 49, a multiplexer 44, and a RAM 45. The first color difference signal input terminal 43 receives the first color difference signal 202 (CR) from the color difference video signal reproducing circuit 4 (FIG. 8). The write address generating circuit 47 generates an address value 213 of 8 bits based on the value of the received first color difference signal 202. The input terminal 48 receives the signal 210 representing the red offset conversion characteristic 207 from the color difference control circuit 37 (FIG. 8). The input terminal 50 receives the signal 212 representing the green offset conversion characteristic 209 from the color difference control circuit 39 (FIG. 8). The color difference table generating circuit 49 generates first offset data 221 based on the address value 213, the signal 210 representing the red offset conversion characteristic 207, and the signal 212 representing the green gain conversion characteristic 209. The multiplexer 44 switches between the first color difference signal 202 and the address value 213. The RAM 45 converts the gain of the first color difference signal 202 based on the first offset data 221, and outputs the gain-converted first color difference signal 202 through the first color difference signal output terminal 46 to the encoder 5 (FIG. 8).

When the first color difference signal input terminal 43 receives the first color difference signal 202 (CR) from the color difference video signal reproducing circuit 4 (FIG. 8), the write address generating circuit 47 generates the address value 213 of 8 bits based on the value of the received first color difference signal 202. The color difference table generating circuit 49 generates the first offset data 221 based on the address value 213, the signal 210 representing the red offset conversion characteristic 207, and the signal 212 representing the green offset conversion characteristic 209. The multiplexer 44 selects and outputs the address value 213 to an address of the RAM 45. The first or second offset data 221 generated by the color difference table generating circuit 49 is written into the RAM 45 based on the address value 213. This write operation is carried out during a vertical scanning period for a video signal. The multiplexer 44 selects and outputs the first color difference signal 202 to the RAM 45. The offset of the first color difference signal 202 is converted based on the first offset data 221 held in the RAM 45, and the converted first color difference signal 202 is output as the first color difference signal 204 through the first color difference signal output terminal 46 to the encoder 5.

Figure 11:
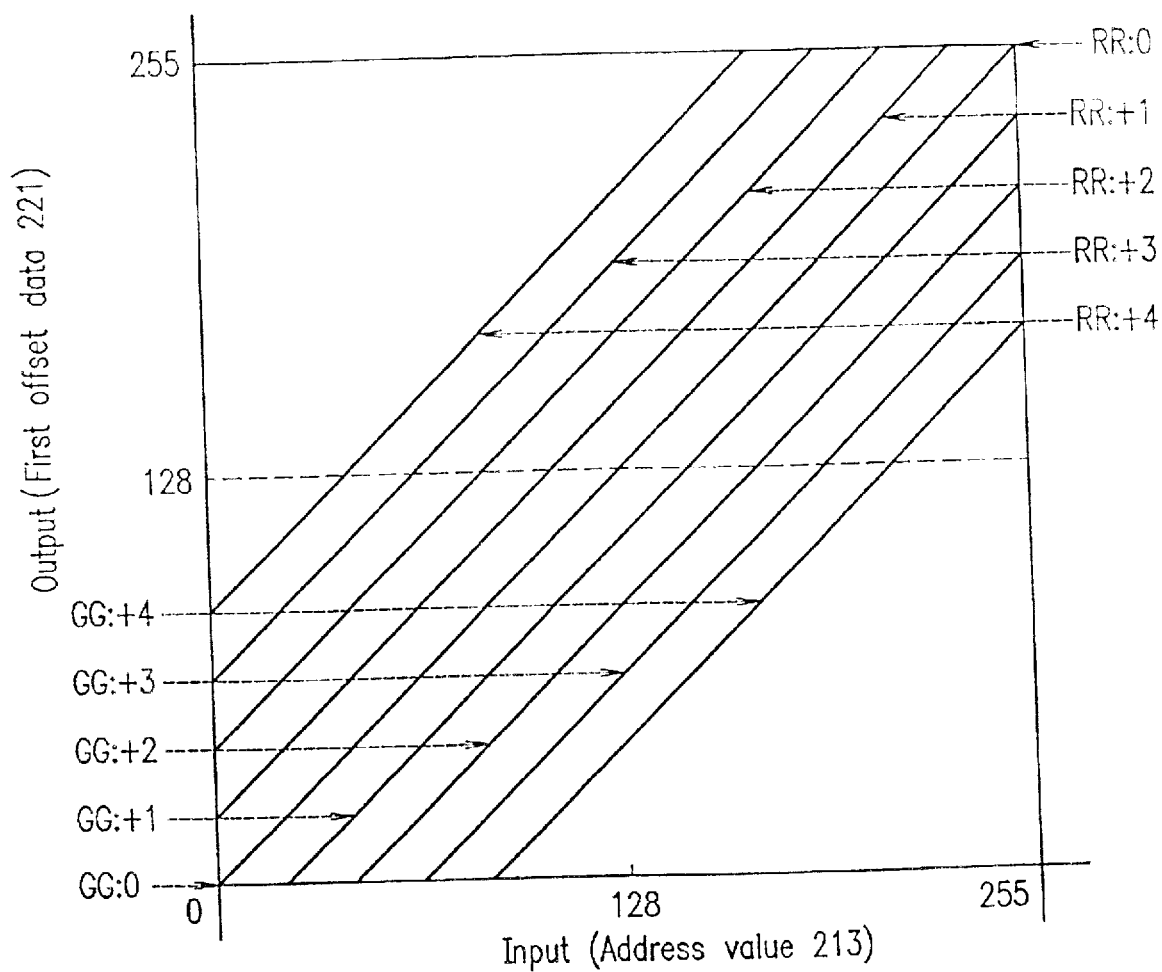
FIG. 11 is a graph showing a relationship between the address values of a red offset and a green offset, and first offset data in Example 2.

FIG. 11 is a graph showing a relationship among a red offset, a green offset, the address value 213, and the first offset data 221 in Example 2.

In FIG. 10, the signal 210 representing the red offset conversion characteristic 207 set by the red offset setting section 40 is input through the input terminal 48 to the RAM circuit 35. The signal 210 representing the red offset conversion characteristic 207 indicates one of red offset characteristics RR:0, RR:+1, RR:+2, RR:+3, and RR:+4 shown in FIG. 11.

As described with reference to FIG. 9, the median of the first color difference signal (CR) represents an achromatic color while a value more than or equal to the median substantially represents a saturation of red. The color difference table generating circuit 49 generates the first gain data 221 based on the address value 213 and one of the red offset characteristics RR:0, RR:+1, RR:+2, RR:+3, and RR:+4 shown in FIG. 11, thereby increasing the redness of an entire image. In FIG. 11, the red offset characteristic RR:0 represents an original offset, and the red offset characteristics RR:+1, RR:+2, RR:+3, and RR:+4 increases in this order, thereby increasing the redness of the image. The first color difference signal 202 (CR) is digital data of 8 bits. Therefore, the address value 213 in the range from 128 to 255 substantially represents a saturation of red.

In FIG. 10, when the signal 210 representing the red offset conversion characteristic 207 set by the red offset setting section 40 is input through the input terminal 48 to the RAM circuit 35, the color difference table generating circuit 49 generates the first gain data 221 based on one of the red offset characteristics RR:0, RR:+1, RR:+2, RR:+3, and RR:+4 indicated by the signal 210 representing the red offset conversion characteristic 207. For example, when the signal 210 representing the red offset conversion characteristic 207 indicates the red offset characteristic RR:+3, the color difference table generating circuit 49 generates the first gain data 221 from the address value 213 based on the red offset characteristic RR:+3.

In FIG. 10, the signal 212 representing the green offset conversion characteristic 209 set by the green offset setting section 42 is input through the input terminal 50 to the RAM circuit 35. The signal 212 representing the green offset conversion characteristic 209 indicates one of green offset characteristics GG:0, GG:+1, GG:+2, GG:+3, and GG:+4 shown in FIG. 11.

As described with reference to FIG. 9, the median of the first color difference signal (CR) represents an achromatic color while a value less than the median substantially represents a saturation of green. The color difference table generating circuit 49 generates the first offset data 221 based on the address value 213 and one of the green offset characteristics GG:0, GG:+1, GG:+2, GG:+3, and GG:+4 shown in FIG. 11, thereby performing offset control in such a manner as to increase the greenness of an entire image. In FIG. 11, the green offset characteristic GG:0 represents an original offset, and the green offset characteristics GG:+1, GG:+2, GG:+3, and GG:+4 increase in this order, thereby increasing the greenness of the image. The first color difference signal 202 (CR) is digital data of 8 bits. Therefore, the address value 213 in the range from 0 to 127 substantially represents a saturation of green.

In FIG. 10, when the signal 212 representing the green offset conversion characteristic 209 set by the green offset setting section 42 is input through the input terminal 50 to the RAM circuit 35, the color difference table generating circuit 49 generates the first offset data 221 based on one of the green offset characteristics GG:0, GG:+1, GG:+2, GG:+3, and GG:+4 indicated by the signal 212 representing the green offset conversion characteristic 209. For example, when the signal 212 representing the green offset conversion characteristic 209 indicates the green offset characteristic GG:+3, the color difference table generating circuit 49 generates the first offset data 221 from the address value 213 based on the green offset characteristic GG:+3.

The red and green offset setting sections 40 and 42 can set offset values separately (i.e., simultaneously). For example, an offset for the first color difference signal 202 (CR) is obtained by CR offset=(red offset)−(green offset).

Therefore, to set the green offset to "+1" means that the red offset is decreased by "−1". For example, when the red offset is set to "+3" and the green offset is set to "+1", an offset for the first color signal 202 (CR) is obtained by $$CR\ offset = (red\ offset) - (green\ offset)$$
$$= (+3) - (+1)$$
$$= 3 - 1$$
$$= 2\ (RR:\ +2).$$

This offset corresponds to the red offset characteristic RR:+2. Therefore, when the red offset is set to "+3" and the green offset is set to "+1", the color difference table generating circuit 49 generates the first offset data 221 based on the red offset characteristic RR:+2.

Figure 12:
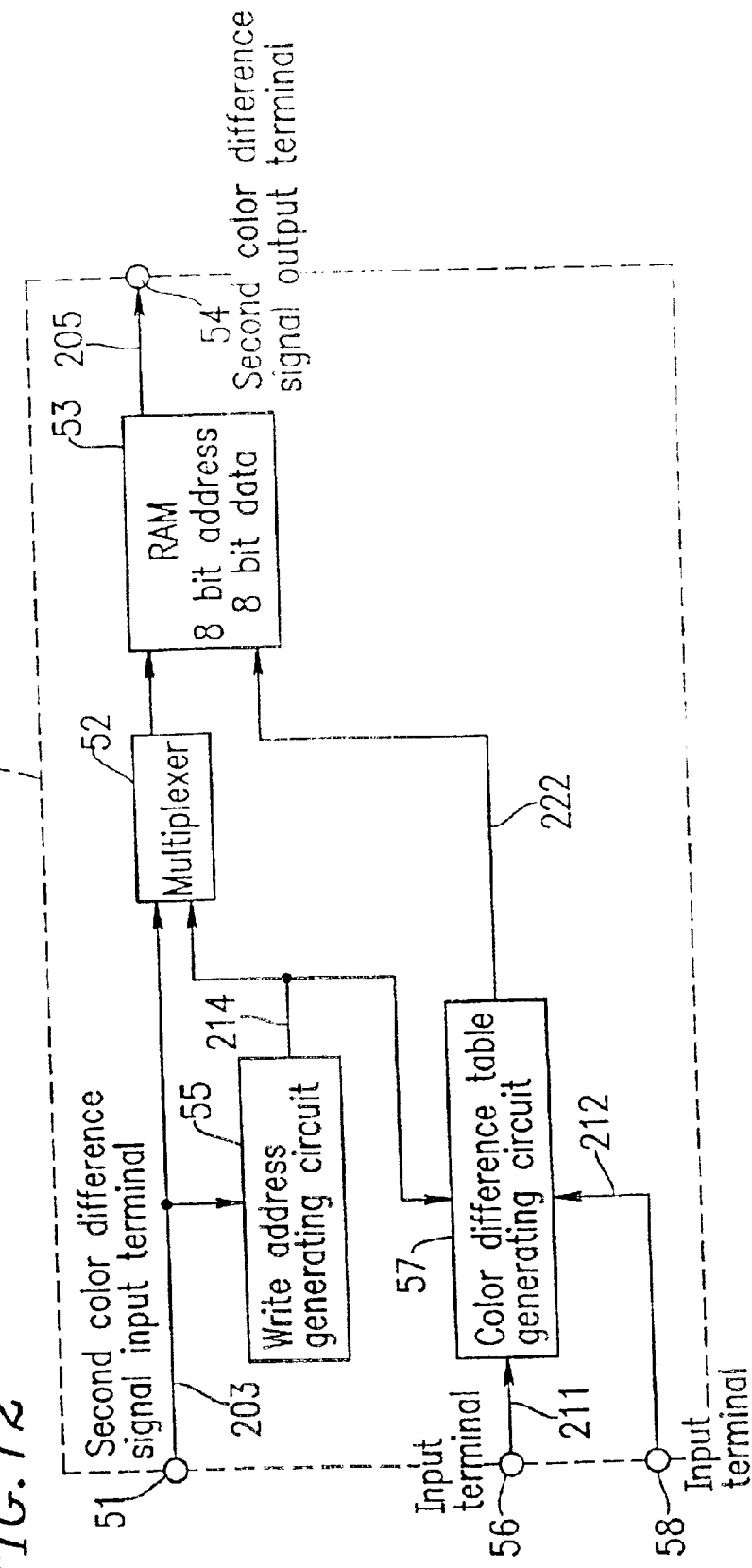
FIG. 12 is a block diagram showing a configuration of another RAM circuit in Example 2.

Similarly, a configuration and an operation of the RAM circuit 36 included in the video signal processing apparatus 200 will be described below. FIG. 12 shows a configuration of the RAM circuit 36.

The RAM circuit 36 includes a second color difference signal input terminal 51, a write address generating circuit 55, an input terminal 56, an input terminal 58, a color difference table generating circuit 57, and a RAM 53. The second color difference signal input terminal 51 receives the second color difference signal 203 (CB) from the color difference video signal reproducing circuit 4 (FIG. 8). The write address generating circuit 55 generates an address value 214 of 8 bits based on the value of the received second color difference signal 203. The input terminal 56 receives the signal 211 representing the blue offset conversion characteristic 208 from the color difference control circuit 37 (FIG. 8). The color difference table generating circuit 57 generates second offset data 222 based on the address value 214 and either the signal 211 representing the blue offset conversion characteristic 208 or the signal 212 indicating the green offset characteristics 209. The RAM 53 converts the offset of the second color difference signal 203 based on the second offset data 222, and outputs the offset-converted second color difference signal 203 through the second color difference signal output terminal 54 to the encoder 5 (FIG. 8).

When the second color difference signal input terminal 51 receives the second color difference signal 203 (CB) from the color difference video signal reproducing circuit 4 (FIG. 8), the write address generating circuit 55 generates the address value 214 of 8 bits based on the value of the received second color difference signal 203. The color difference table generating circuit 57 generates the second offset data 222 based on the address value 214 and either the signal 211 representing the blue offset conversion characteristic 208 or the signal 212 representing the green offset conversion characteristic 209. The multiplexer 52 selects and outputs the address value 214 to an address of the RAM 53. The second offset data 222 is written into the RAM 53 based on the address value 214. This write operation is carried out during a vertical scanning period for a video signal. The multiplexer 52 selects and outputs the second color difference signal 203 to the RAM 53. The offset of the second color difference signal 203 is converted based on the second offset data 222 held in the RAM 53, and the converted second color difference signal 203 is output as the second color difference signal 205 through the second color difference signal output terminal 54 to the encoder 5.

Figure 13:
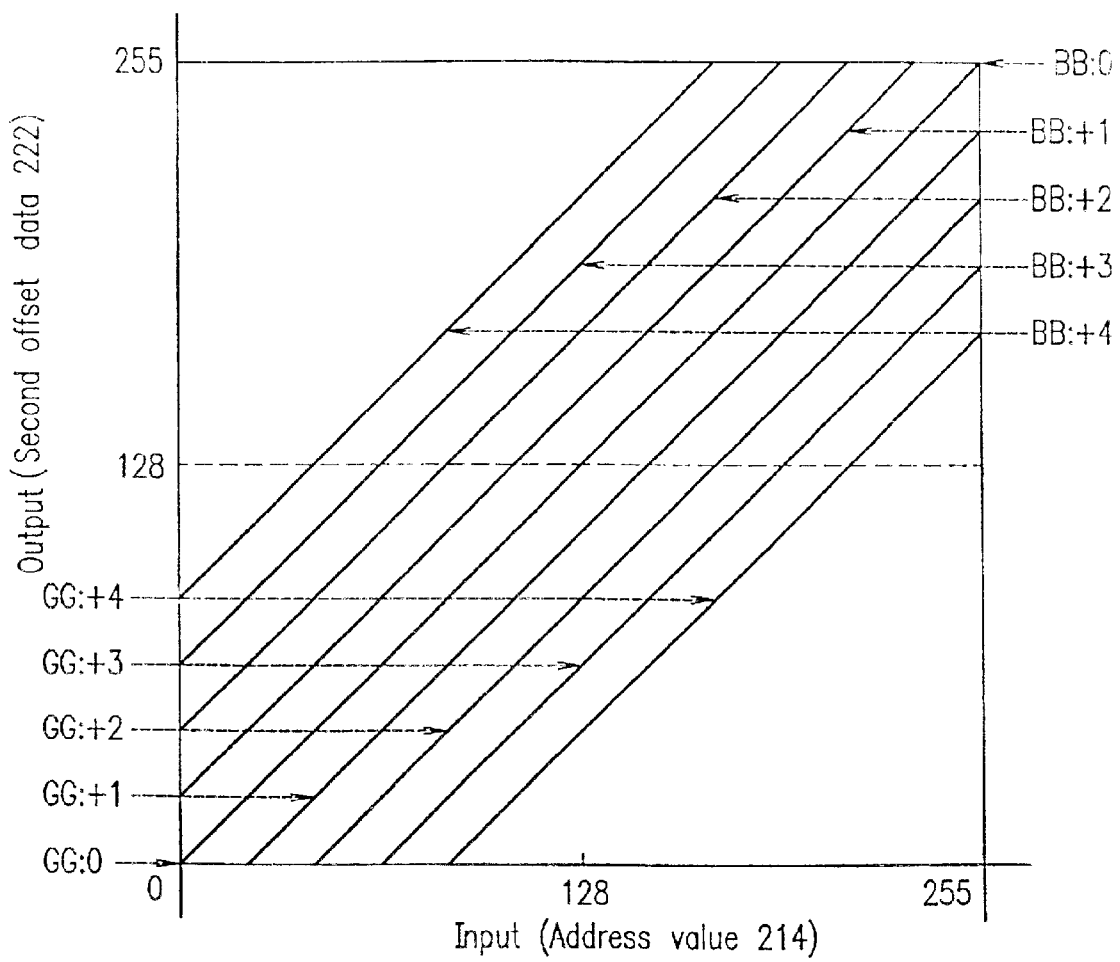
FIG. 13 is a graph showing a relationship between the address values of a blue offset and a green offset, and second offset data in Example 2.

FIG. 13 is a graph showing a relationship among a blue offset, a green offset, the address value 214, and the second offset data 222 in Example 2.

In FIG. 13, the signal 211 representing the blue offset conversion characteristic 208 set by the blue offset setting section 41 is input through the input terminal 56 to the RAM circuit 36. The signal 211 representing the blue offset conversion characteristic 208 indicates one of blue offset characteristics BB:0, BB:+1, BB:+2, BB:+3, and BB:+4 shown in FIG. 13.

As described with reference to FIG. 9, the median of the second color difference signal (CB) represents an achromatic color while a value more than or equal to the median substantially represents a saturation of blue. The color difference table generating circuit 57 generates the second offset data 222 based on the address value 214 and one of the blue offset characteristics BB:0, BB:+1, BB:+2, BB:+3, and BB:+4 shown in FIG. 13, thereby performing offset control in such a manner as to increase the blueness of an entire image. In FIG. 13, the blue offset characteristic B:0 represents an original offset, and the blue offset characteristics BB:+1, BB:+2, BB:+3, and BB:+4 increase in this order, thereby increasing the blueness of the image. The second color difference signal 203 (CB) is digital data of 8 bits. Therefore, the address value 214 in the range from 128 to 255 substantially represents a saturation of blue.

In FIG. 12, when the signal 211 representing the blue offset conversion characteristic 208 set by the blue offset setting section 41 is input through the input terminal 56 to the RAM circuit 36, the color difference table generating circuit 57 generates the second offset data 222 based on one of the blue offset characteristics BB:0, BB:+1, BB:+2, BB:+3, and BB:+4 indicated by the signal 211 representing the blue offset conversion characteristic 208. For example, when the signal 211 representing the blue offset conversion characteristic 208 indicates the blue offset characteristic BB:+3, the color difference table generating circuit 57 generates the second offset data 222 from the address value 214 based on the blue offset characteristic BB:+3.

In FIG. 12, the signal 212 representing the green offset conversion characteristic 209 set by the green offset setting section 42 is input through the input terminal 58 to the RAM circuit 36. The signal 212 representing the green offset conversion characteristic 209 indicates one of green offset characteristics GG:0, GG:+1, GG:+2, GG:+3, and G:−4 shown in FIG. 13.

As described with reference to FIG. 9, the median of the second color difference signal 203 (CB) represents an achromatic color while a value less than the median substantially represents a saturation of green. The color difference table generating circuit 57 generates the second offset data 222 based on the address value 214 and one of the green offset characteristics GG:0, GG:+1, GG:+2, GG:+3, and GG:+4 shown in FIG. 13, thereby performing offset control in such a manner as to increase the greenness of an entire image. In FIG. 13, the green offset characteristic GG:0 represents an original offset, and the green offset characteristics GG:+1, GG:+2, GG:+3, and GG:+4 increase in this order, thereby increasing the greenness of the image. The second color difference signal 203 (CB) is digital data of 8 bits. Therefore, the address value 214 in the range from 0 to 127 substantially represents a saturation of green.

In FIG. 12, when the signal 212 representing the green offset conversion characteristic 209 set by the green offset setting section 42 is input through the input terminal 58 to the RAM circuit 36, the color difference table generating circuit 57 generates the second offset data 222 based on one of the green offset characteristics GG:0, GG:+1, GG:+2, GG:+3, and GG:+4 indicated by the signal 212 representing the green offset conversion characteristic 209. For example, when the signal 212 representing the green offset conversion characteristic 209 indicates the green offset characteristic GG:+3, the color difference table generating circuit 57 generates the second offset data 222 from the address value 214 based on the green offset characteristic GG:+3.

The blue and green offset setting sections 41 and 42 can set offset values separately (i.e., simultaneously). For example, an offset for the second color difference signal 203 (CB) is obtained by $$CB\ offset = (blue\ offset) - (green\ offset).$$

Therefore, to set the green offset to "+1" means that the blue offset is decreased by "−1". For example, when the blue offset is set to "+1" and the green offset is set to "+1", an offset for the second color signal 203 (CB) is obtained by $$\begin{aligned}CB\ offset &= (blue\ offset) - (green\ offset)\\ &= (+1) - (+1)\\ &= 1 - 1\\ &= 0\ (BB:\ 0).\end{aligned}$$

This offset corresponds to the blue offset characteristic BB:0. Therefore, when the blue offset is set to "+1" and the green offset is set to "+1", the color difference table generating circuit 57 generates the second offset data 222 based on the blue offset characteristic BB:0.

Thus, when the red offset conversion characteristic 207 is set in the red offset setting section 40 (FIG. 8), the color difference table generating circuit 49 (FIG. 10) generates the first offset data 221 based on the address value 213 based on the value of the received first color difference signal 202 and one of the red offset characteristics RR:0, RR:+1, RR:+2, RR:+3, and RR:+4 (FIG. 11) indicated by the signal 210 representing the red offset conversion characteristic 207. When the green offset conversion characteristic 209 is set in the green offset setting section 42 (FIG. 8), the color difference table generating circuit 49 (FIG. 10) generates the second offset data 221 based on the address value 213 based on the value of the received first color difference signal 202 and one of the green offset characteristics GG:0, GG:+1, GG:+2, GG:+3, and GG:+4 (FIG. 11) indicated by the signal 212 representing the green offset conversion characteristic 209.

When the blue offset conversion characteristic 208 is set in the blue offset setting section 41 (FIG. 8), the color difference table generating circuit 57 (FIG. 12) generates the second offset data 222 based on the address value 214 based on the value of the received second color difference signal 203 and one of the blue offset characteristics BB:0, BB:+1, BB:+2, BB:+3, and B:−4 (FIG. 13) indicated by the signal 211 representing the blue offset conversion characteristic 208. When the green offset conversion characteristic 209 is set in the green offset setting section 42 (FIG. 8), the color difference table generating circuit 57 (FIG. 12) generates the second offset data 222 based on the address value 214 based on the value of the received second color difference signal 203 and one of the green offset characteristics GG:0, GG:+1, GG:+2, GG:+3, and GG:+4 (FIG. 13) indicated by the signal 212 representing the green offset conversion characteristic 209. The RAM 53 converts the offset of the second color difference signal 203 based on the second offset data 222.

Referring to FIG. 8, the encoder 5 generates a video signal based on the first color difference signal 204 whose offset has been converted by the RAM circuit 35, the second color difference signal 205 whose offset has been converted by the RAM circuit 36, and the brightness signal 206 such that the video signal is suited to display on a monitor (not shown). Specifically, the encoder 5 adds a synchronization signal to the received digital brightness signal 206 and outputs the resultant signal as an analog signal. The offset-converted first color difference signal 204 (CR) and the offset-converted second color difference signal 205 (CB) are also converted to analog signals which are output from the encoder 5. In the case where the video signal recorded on the disk 1 is of a progressive type (480P), a progressive color difference signal is also output. Moreover, the offset-converted first color difference signal 204 (CR) and the offset-converted second color difference signal 205 (CB) are modulated using a color sub-carrier to generate a color signal. The color signal, the brightness signal, and a synchronization signal are combined to generate a composite video signal. The thus-generated analog brightness signal, color difference signal, color signal, and composite video signal are output from the video signal output terminal 6.

Figure 14:
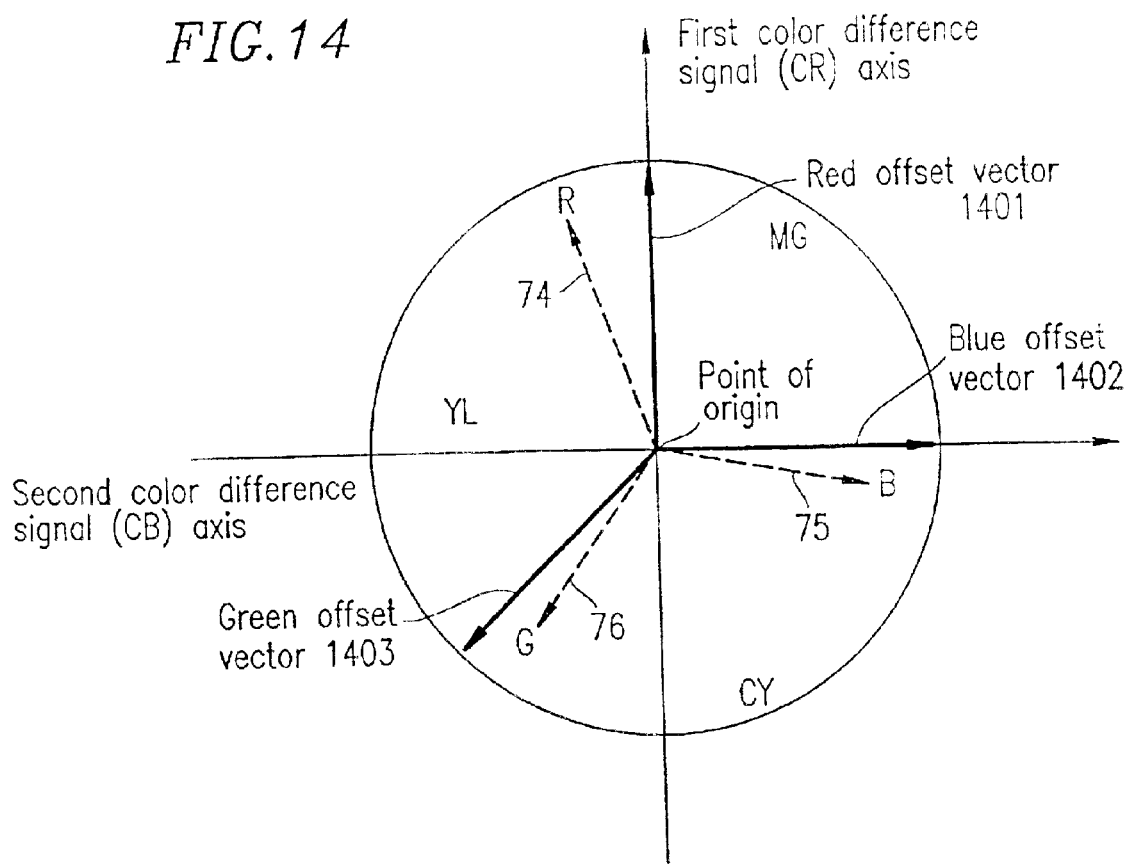
FIG. 14 is a schematic diagram showing offsets of red, blue, and green in Example 1.
Figure 15:
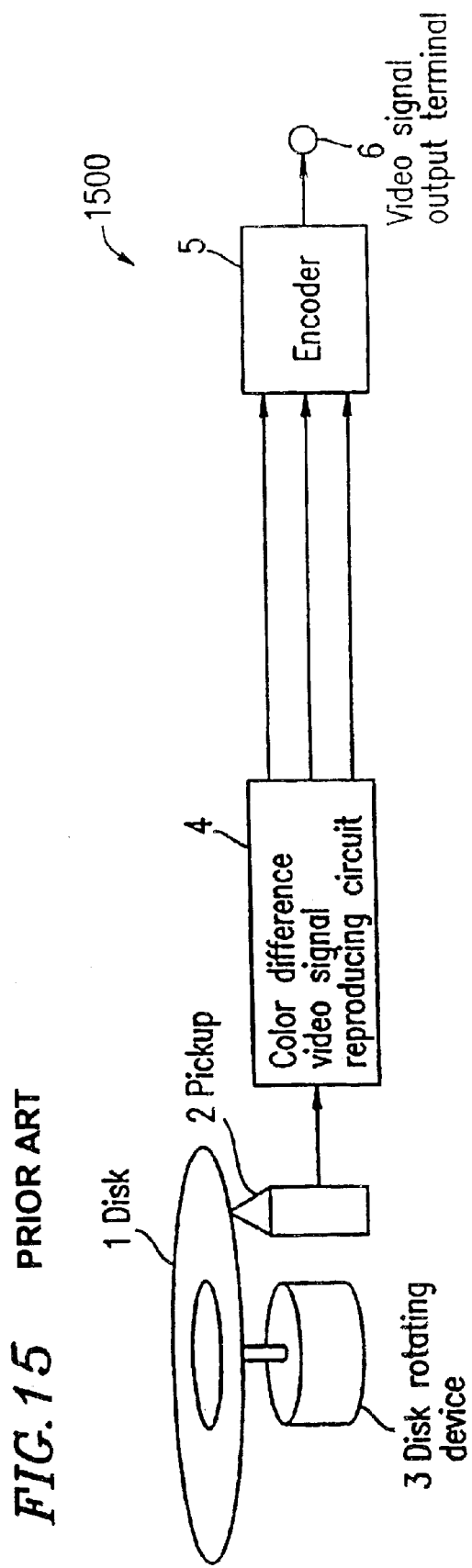
FIG. 15 is a block diagram showing a configuration of a conventional video signal processing apparatus.
Figure 16:
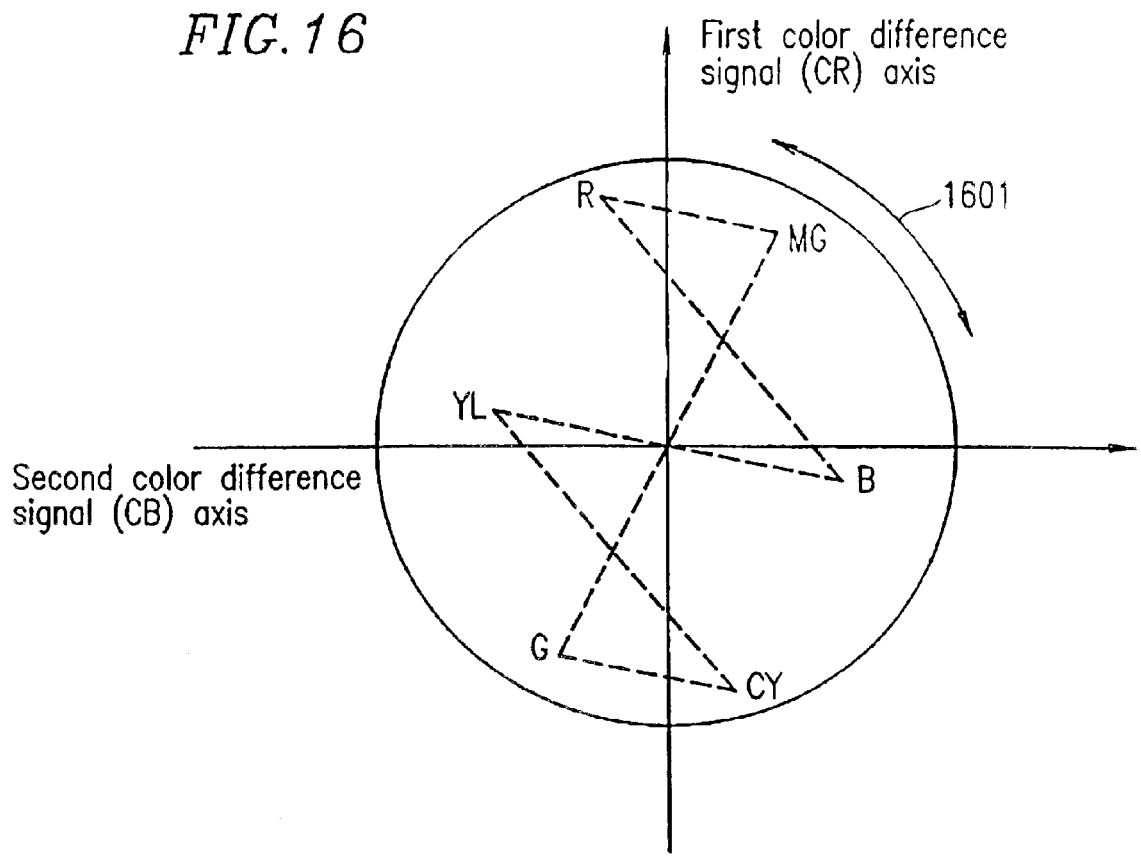
FIG. 16 is a block diagram showing a color difference vector of a conventional video signal processing apparatus.

FIG. 14 is a schematic diagram showing a red offset vector, a blue offset vector, and a green offset vector in the video signal processing apparatus 200 according to Example 2 of the present invention.

Referring to FIG. 14, the lengths of a red offset vector 1401, a blue offset vector 1402, and a green offset vector 1403 (represented by arrows) indicate the sizes of a red offset, a blue offset, and a green offset, respectively. Increasing an offset corresponds to elongating the length of a vector in an arrow-pointing direction. The red offset vector 1401, the blue offset vector 1402, and the green offset vector 1403 have directions which are substantially equal to the directions of a red vector 74, a blue vector 75, and a green vector 76. This shows that a red color, a blue color, and a green color can be separately adjusted using the red offset vector 1401, the blue offset vector 1402, and the green offset vector 1403. Therefore, a red color, a blue color, and a green color can be separately adjusted for a number of types of monitors and, particularly, for a monitor capable of receiving progressive video.

As described above, the present invention can provide a video signal processing apparatus capable of performing more delicate color adjustment by changing a red offset, a blue offset, and a green offset separately in accordance with the user's settings.

It should be noted that the setting of a gain has seven levels in the video signal processing apparatus 100 according to Example 1 of the present invention while the setting of an offset has five levels in the video signal processing apparatus 200 according to Example 2 of the present invention. The number of levels may be increased or decreased.

In such cases, the present invention can also provide a video signal processing apparatus capable of performing more delicate color adjustment.

Further, a gain is set only in such a manner as to reduce the gain in the video signal processing apparatus 100 according to Example 1 of the present invention while an offset is set only in such a manner as to increase the offset in the video signal processing apparatus 200 according to Example 2 of the present invention. A gain or offset may be set in such a manner as to increase the gain or reduce the offset.

Still further, in the video signal processing apparatuses 100 and 200 according to Examples 1 and 2 of the present invention, gain or offset conversion is carried out using a table in a RAM. These conversions may be carried out in a multiplier or adder.

Those skilled in the art would understand that each circuit included in the video signal processing apparatuses 100 and 200 according to Examples 1 and 2 of the present invention may be realized with software.

Although a gain is solely set in the video signal processing apparatus 100 according to Example 1 of the present invention while an offset is solely set in the video signal processing apparatus 200 according to Example 1 of the present invention, both a gain and an offset may be set in combination. Further, although in the above-described Examples, the red, blue, and green gain setting sections 12 through 14 and the red, blue, and green offset setting sections 40 through 42 each include a setting switch so that these colors can be separately set. The present invention is not limited to this. Alternatively, red, blue, and green may be set to relative values using a color relative setting control section so that the gain setting sections 12 through 14 and the offset setting sections 40 through 43 may be controlled.

Although in Examples, a video signal processing apparatus processes a video signal recorded on a disk medium, the present invention may be applied to a video signal processing apparatus processing a video signal recorded in a tape medium or a video signal transmitted via satellite broadcast, ground-based broadcast, or the like.

Thus, the present invention can provide a video signal processing apparatus capable of performing more delicate color adjustment.

The present invention can also provide a video signal processing apparatus capable of performing color adjustment by separately adjusting the hues of red, blue, and green.

Further, the present invention can provide a video signal processing apparatus capable of separately changing the gains of two color difference signal for each of red, blue, and green in accordance with user's settings.

Furthermore, the present invention can provide a video signal processing apparatus capable of separately changing the offsets of two color difference signal for each of red, blue and green in accordance with user's settings.

What is claimed is:

1. A video signal processing apparatus for processing a video signal containing first and second color difference signals so as to adjust colors of an image represented by the video signal, comprising:

a first gain setting section for setting a first gain conversion characteristic relevant to a first saturation indicated by the first color difference signal;

a second gain setting section for setting a second gain conversion characteristic relevant to a second saturation indicated by the second color difference signal;

a third gain setting section for setting a third gain conversion characteristic relevant to a third saturation indicated by the first and second color difference signals;

a first conversion section for converting a gain of the first color difference signal based on a first input value of the first color difference signal, the first gain conversion characteristic, and the third gain conversion characteristic; and a second conversion section for converting a gain of the second color difference signal based on a second input value of the second color difference signal, the second gain conversion characteristic, and the third gain conversion characteristic.

2. A video signal processing apparatus according to claim 1, wherein the first conversion section converts the gain of the first color difference signal based on the first gain conversion characteristic when the first input value of the first color difference signal falls within a first range, and converts the gain of the first color difference signal based on the third gain conversion characteristic when the first input value of the first color difference signal does not fall within the first range; and the second conversion section converts the gain of the second color difference signal based on the second gain conversion characteristic when the second input value of the second color difference signal falls within a second range, and converts the gain of the second color difference signal based on the third gain conversion characteristic when the second input value of the second color difference signal does not fall within the second range.

3. A video signal processing apparatus according to claim 1, wherein the first conversion section converts the gain of the first color difference signal based on the first gain conversion characteristic when the first input value of the first color difference signal is more than or equal to a first threshold, and converts the gain of the first color difference signal based on the third gain conversion characteristic when the first input value of the first color difference signal is less than the first threshold; and the second conversion section converts the gain of the second color difference signal based on the second gain conversion characteristic when the second input value of the second color difference signal is more than or equal to a second threshold, and converts the gain of the second color difference signal based on the third gain conversion characteristic when the second input value of the second color difference signal is less than the second threshold.

4. A video signal processing apparatus according to claim 3, wherein the first threshold includes a median representing an achromatic color between red and cyan, and the second threshold includes a median representing an achromatic color between blue and yellow.

5. A video signal processing apparatus according to claim 1, wherein the first saturation includes a saturation of red representing a color depth in the vicinity of red;

the second saturation includes a saturation of blue representing a color depth in the vicinity of blue; and the third saturation includes a saturation of green representing a color depth in the vicinity of green.

6. A video signal processing apparatus according to claim 1, wherein the first conversion section includes:

a first gain data generating section for generating first gain data based on the first input value of the first color difference signal and the first gain conversion characteristic;

a second gain data generating section for generating second gain data based on the first input value of the first color difference signal and the third gain conversion characteristic;

a first selection section for selecting either the first gain data or the second gain data based on the first input value of the first color difference signal; and a first gain converting section for converting the gain of the first color difference signal based on either the first gain data or the second gain data selected by the first selection section, and wherein the second conversion section includes:

a third gain data generating section for generating third gain data based on the second input value of the second color difference signal and the second gain conversion characteristic;

a fourth gain data generating section for generating fourth gain data based on the second input value of the second color difference signal and the third gain conversion characteristic;

a second selection section for selecting either the third gain data or the fourth gain data based on the second input value of the second color difference signal; and a second gain converting section for converting the gain of the second color difference signal based on either the third gain data or the fourth gain data selected by the second selection section.

7. A video signal processing apparatus for processing a video signal containing first and second color difference signals so as to adjust colors of an image represented by the video signal, comprising:

a first offset setting section for setting a first offset conversion characteristic relevant to a first saturation indicated by the first color difference signal;

a second offset setting section for setting a second offset conversion characteristic relevant to a second saturation indicated by the second color difference signal;

a third offset setting section for setting a third offset conversion characteristic relevant to a third saturation indicated by the first and second color difference signals;

a first conversion section for converting an offset of the first color difference signal based on a first input value of the first color difference signal and either the first offset conversion characteristic or the third offset conversion characteristic; and a second conversion section for converting an offset of the second color difference signal based on a second input value of the second color difference signal and either the second offset conversion characteristic or the third offset conversion characteristic.

8. A video signal processing apparatus according to claim 7, where the first input value of the first color difference signal has a maximum value relevant to a maximum color saturation of a red color, a minimum value relevant to a maximum color saturation of a cyan color, and a median representing an achromatic color between the red color and the cyan color; and the second input value of the second color difference signal has a maximum value relevant to a maximum color saturation of a blue color, a minimum value relevant to a maximum color saturation of a yellow color, and a median representing an achromatic color between the blue color and the yellow color.

9. A video signal processing apparatus according to claim 7, wherein the first saturation includes a saturation of red representing a color depth in the vicinity of red;

the first offset conversion characteristic provides an offset value relevant to red;

the second saturation includes a saturation of blue representing a color depth in the vicinity of blue;

the second offset conversion characteristic provides an offset value relevant to blue;

the third saturation includes a saturation of green representing a color depth in the vicinity of green; and the third offset conversion characteristic provides an offset value relevant to green.

10. A video signal processing apparatus according to claim 7, wherein the first conversion section includes:

a first offset data generating section for generating first offset data based on the first input value of the first color difference signal and either the first offset conversion characteristic or the third offset conversion characteristic; and a first offset converting section for converting the offset of the first color difference signal based on the first offset data, and wherein the second conversion section includes:

a second offset data generating section for generating second offset data based on the second input value of the second color difference signal and either the second offset conversion characteristic or the third offset conversion characteristic; and a second offset converting section for converting the offset of the second color difference signal based on the second offset data.

* * * * *